US012689523B2

(12) United States Patent
Pfaff et al.

(10) Patent No.: US 12,689,523 B2
(45) Date of Patent: Jul. 21, 2026

(54) HANDLING OF VERIFICATION CHAINS IN THE AUTHENTICATION OF DATA STREAMS

(71) Applicant: Fraunhofer-Gesellschaft zur Foerderung der angewandten Forschung e.V., Munich (DE)

(72) Inventors: Jonathan Pfaff, Berlin (DE); Tobias Hinz, Berlin (DE); Karsten Sühring, Berlin (DE); Heiko Schwarz, Berlin (DE); Robert Skupin, Berlin (DE); Yago Sánchez De La Fuente, Berlin (DE); Cornelius Hellge, Berlin (DE); Thomas Schierl, Berlin (DE); Detlev Marpe, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 19/367,617

(22) Filed: Oct. 23, 2025

(65) Prior Publication Data

US 2026/0113202 A1 Apr. 23, 2026

(30) Foreign Application Priority Data

Oct. 23, 2024 (EP) ..................................... 24208515

(51) Int. Cl.
*H04L 9/32* (2006.01)
(52) U.S. Cl.
CPC .......... *H04L 9/3247* (2013.01); *H04L 9/3236* (2013.01); *H04L 9/3263* (2013.01)

(58) Field of Classification Search
CPC .... H04L 9/3247; H04L 9/3236; H04L 9/3263
(Continued)

(56) References Cited

U.S. PATENT DOCUMENTS 6,959,384 B1 * 10/2005 Serret-Avila .......... H04L 9/3236
713/168
8,214,632 B2 7/2012 Choi et al.
(Continued)

FOREIGN PATENT DOCUMENTS

CN 107871063 A 4/2018
EP 3737109 A1 11/2020
(Continued)

OTHER PUBLICATIONS

C2PA, "Coalition for Content Provenance and Authenticity", 2.2, May 1, 2025, 248 pages.
(Continued)

*Primary Examiner* — Dereena T Cattungal
(74) *Attorney, Agent, or Firm* — PERKINS COIE LLP; Michael A. Glenn

(57) ABSTRACT

Apparatuses and methods for checking a data stream on trustworthiness are described. According to an aspect, the data stream indicates, whether a segment is a first segment or whether a segment is a last segment of assigned sequence of segments. According to another aspect, an apparatus for decoding a data stream is configured for deriving, from the data stream, whether a verification chain within a temporal sequence of segments is interrupted at a segment.

16 Claims, 12 Drawing Sheets

(58) Field of Classification Search
USPC .......................................................... 713/176
See application file for complete search history.

(56) References Cited

U.S. PATENT DOCUMENTS

| | | | |
|---|---|---|---|
| 8,885,818 | B2 | 11/2014 | Boehm et al. |
| 2004/0139322 | A1 | 7/2004 | Shewchuk et al. |
| 2010/0005309 | A1* | 1/2010 | Gentry .................. H04L 9/3247 |
| | | | 713/176 |
| 2011/0179279 | A1 | 7/2011 | Greevenbosch et al. |
| 2014/0020013 | A1 | 1/2014 | Dilorenzo |
| 2016/0080742 | A1 | 3/2016 | Kirchhoffer et al. |
| 2018/0063217 | A1 | 3/2018 | Barkley et al. |
| 2018/0220161 | A1 | 8/2018 | Schierl et al. |
| 2019/0387259 | A1 | 12/2019 | Coban et al. |
| 2020/0372184 | A1 | 11/2020 | Meirosu |
| 2022/0217406 | A1 | 7/2022 | Hannuksela |
| 2022/0321886 | A1 | 10/2022 | Schwarz et al. |
| 2022/0321918 | A1 | 10/2022 | He et al. |
| 2023/0020655 | A1* | 1/2023 | Xu ........................ H04L 9/3297 |
| 2023/0134652 | A1 | 5/2023 | Deshpande |
| 2023/0202601 | A1 | 6/2023 | Takechi et al. |
| 2023/0325473 | A1* | 10/2023 | Buffard ................... G06F 21/10 |
| | | | 713/155 |
| 2023/0353385 | A1* | 11/2023 | Chou .................... H04L 9/3239 |
| 2024/0259580 | A1 | 8/2024 | Völcker et al. |
| 2024/0314367 | A1* | 9/2024 | Jenks .................... H04L 9/3247 |
| 2024/0323029 | A1* | 9/2024 | Lexfors .............. H04N 21/2335 |
| 2025/0202718 | A1* | 6/2025 | Jespers ................. H04L 9/3268 |

FOREIGN PATENT DOCUMENTS

| | | |
|---|---|---|
| RU | 2452007 C2 | 5/2012 |
| RU | 2574848 C2 | 10/2016 |

OTHER PUBLICATIONS

FIPS, "Digital Signature Standard DSS", FIPS 186-5, Feb. 2023, 86 pages.

FIPS, "Secure Hash Standard (SHS)", FIPS Pub 180-4, Aug. 2015, 36 pages.

IETF, "Internet Standard", IETF Internal Standard 66.

ISO/IEC, 11578:1996, Annex A.

ITU, "Advanced video coding for generic audiovisual services", ITU-T H.264, Series H: Audiovisual and Multimedia Systems Infrastructure of audiovisual services—Coding of moving video, (Jun. 2019) 836 pages.

ITU, "High Efficiendy Video Coding", ITU-T H.265 (Jun. 2019) Series H: Audiovisual and Multimedia Systems, Infrastructure of audiovisual services—Coding of moving video, 696 pages.

ITU, "Versatile video coding", ITU-T H.266 (Aug. 2020) Series H: Audiovisual and Multimedia Systems, Infrastructure of audiovisual services—Coding of moving Video, 516 pages.

Marpe, Detlev, "Context-Based Adaptive Binary Arithmetic Coding in the H.264/AVC Video Compression Standard", IEEE Transactions on Circuits and Systems for Video Technology, vol. 13, No. 7, published Jul. 31, 2003 < URL: https://ieeexplore.ieee.org/document/1218195 > [retrieved on Nov. 27, 2025, 17 pages.

Suehring, Karsten, "AHG9: Digitally Signed Content Authentication SEI", Joint Video Experts Team (JVET) of ITU-T SG 16 WP 3 and ISO/IEC JTC 1/SC 29 35th Meeting, Sapporo, JP, Jul. 12-19, 2024, Document: JVET-AI0127-v1, published Jul. 5, 2024, <URL:https://www.itu.int/wftp3/av-arch/jvet-site/2024_07_AI_Sapporo/documents/JVET-AI0127-v1.zip> [retrieved on Nov. 27, 2025] 10 pages.

Xu, Jizheng, "AHG9: Digital signature SEI message", Joint Video Experts Team (JVET) of ITU-T SG 16 WP 3 and ISO/IEC JTC 1/SC 29 20th Meeting, by teleconference, Oct. 7-16, 2020, Document: JVET-T0090, published Oct. 9, 2020, <URL:https://www.itu.int/wftp3/av-arch/jvet-site/2020_10_T_Virtual/documents/JVET-T0090-v1.zip>[retrieved on Nov. 27, 2025] 5 pages.

Part 1 of 3—"High efficiency video coding; TD-PLEN-0279", ITU-T Draft; Study Period 2021-2024; Study Group 16; Series TD-PLEN-0279, International Telecommunication Union, Geneva ; CH, vol. ties/16 Apr. 24, 2024 (Apr. 24, 2024), pp. 1-728, XP044411196, Retrieved from the Internet: URL:https://www-api.itu.int/ifa/t/2022/sg16/docs/240415/td/ties/plen/T22-SG16-240415-TD-PLEN-0279!A1!MSW-E.docx [retrieved on Apr. 24, 2024] p. 357-p. 358 *—(112 pages).

Part 2 of 3—"High efficiency video coding; TD-PLEN-0279", ITU-T Draft; Study Period 2021-2024; Study Group 16; Series TD-PLEN-0279, International Telecommunication Union, Geneva ; CH, vol. ties/16 Apr. 24, 2024 (Apr. 24, 2024), pp. 1-728, XP044411196, Retrieved from the Internet: URL:https://www-api.itu.int/ifa/t/2022/sg16/docs/240415/td/ties/plen/T22-SG16-240415-TD-PLEN-0279!A1!MSW-E.docx [retrieved on Apr. 24, 2024] p. 357-p. 358 *—(116 pages).

Part 3 of 3—"High efficiency video coding; TD-PLEN-0279", ITU-T Draft; Study Period 2021-2024; Study Group 16; Series TD-PLEN-0279, International Telecommunication Union, Geneva ; CH, vol. ties/16 Apr. 24, 2024 (Apr. 24, 2024), pp. 1-728, XP044411196, Retrieved from the Internet: URL:https://www-api.itu.int/ifa/t/2022/sg16/docs/240415/td/ties/plen/T22-SG16-240415-TD-PLEN-0279!A1!MSW-E.docx [retrieved on Apr. 24, 2024] p. 357-p. 358 *—(100 pages).

Hannuksela (Nokia) M M et al: "AHG9: Digital signing of selected SEI messages", 39. JVET Meeting; Jun. 26-Jul. 4, 2025; Daejeon; (The Joint Video Exploration Team of ISO/IEC JTC1/SC29/WG11 and ITU-T SG.16), No. JVET-AM0118 ; m73027 Jun. 19, 2025 (Jun. 19, 2025), XP030338544, Retrieved from the Internet: URL:https://jvet-experts.org/doc_end_user/documents/39_Daejeon/wg11/JVET-AM0118-v1.zip JVET-AM0118-v1.docx [retrieved on Jun. 19, 2025]—8 pages.

Shintaro Ueda et al: "H.264/AVC Stream Authentication at the Network Abstraction Layer", Information Assurance and Security Workshop, 2007. IAW '07. IEEE SMC, IEEE, PI, Jun. 1, 2007 (Jun. 1, 2007), pp. 302-308, XP031113793; ISBN: 978-1-4244-1303-4.

Li, et al., "Research on Real-Time Video Stream Authentication Based on SM2 in H.264", 2023 4th International Conference on Computer Engineering and Intelligent Control (ICCEIC) pp. 312-316 (Year: 2023).

Anonymous, "Dolby AC-4: Audio Delivery 1-15 G06F for Next-generation Entertainment Services", Jun. 1, 2015 (Jun. 1, 2015), XP055324838, Retrieved from the Internet: URL:http://www.dolby.com/us/en/technologie s/ac-4/Next Generation-Entertainment-Servi ces.pdf [retrieved on Nov. 30, 2016] * figures 10, 16, 30 pages.

Anonymous, "ONVIF—Media Signing 1-15 Specification", Dec. 31, 2024 (Dec. 31, 2024), XP093373658, Retrieved from the Internet: URL:https://www.onvif.org/specs/2412/ONVIF -MediaSigning-Spec-v2412.pdf [retrieved on Mar. 5, 2026] * sections 5.1-5.7 * * Annex B ** figures 10-14 *, pp. 1-25.

Füg, et al., "An Introduction to 1-15 INV. MPEG-H 3D Audio", H04N19/ G06F21/64 Jan. 1, 2015 (Jan. 1, 2015), XP055866069, H04L9/32 Retrieved from the Internet: H04L9/40 URL:https://pub.dega-akustik.de/DAGA_2015/ H04N21/835 data/articles/000515.pdf [retrieved on Nov. 25, 2021] * abstract * * , pp. 25-28.

Suehring, et al., "AHG9: Digitally Signed 1-15 Content Authentication SEI", 147. MPEG Meeting; Jul. 15, 2024-Jul. 19 ,2024; Sapporo; (Motion Picture Expert Group or ISO/IEC JTC1/SC29/WG11), No. m68490 Jul. 5, 2024 (Jul. 5, 2024), XP030321618, Retrieved from the Internet: URL:https://dms.mpeg. expert/doc_end_user/documents/147_Sapporo/wg11/m68490-JVET-A101 27-v1-JVET-AI0127-v1.zip JVET-AI0127-v1.docx [retrieved on Jul. 5, 2024] * the whole document *, 10 pages.

* cited by examiner

HANDLING OF VERIFICATION CHAINS IN THE AUTHENTICATION OF DATA STREAMS

CROSS-REFERENCE TO RELATED APPLICATIONS

This application claims priority from European Patent Application No. 24208515.7, which was filed on Oct. 23, 2024, and is incorporated herein in its entirety by reference.

Embodiments of the invention relate to apparatuses and methods for decoding a data steam, which is to be checked on trustworthiness. Further embodiments relate to apparatuses and methods for rendering a data stream checkable on trustworthiness. Further embodiments relate to data streams being checkable on trustworthiness. In particular, embodiments relate to media data stream, such as video data streams or audio data streams, as well as decoders and encoders for decoding or encoding such data streams, respectively.

BACKGROUND OF THE INVENTION

Content Authentication is crucial to avoid media tampering. Rapid AI advancements have sparked the creation of sophisticated deepfakes, blurring the lines between real and fake content and raising significant cybersecurity and copyright concerns. Therefore, being able to verify the authenticity of the media is becoming crucial nowadays.

Examples of methods to carry out such authentication consist in, or include, providing digital signatures for the media by first hashing a media asset and then signing it with the private key of the content generator so that at the client side, given a public key of the content generator, the client can compare the provided signature with the value of a hash computed based on the received media asset by itself. Should the values coincide, the client can safely assume that the media has not been tampered.

Complex structures of data streams may complicate the authentication of a data stream. This is particularly true in scenarios, in which a data stream is modified or generated by an entity, which, for example, extracts a portion from a data stream, e.g., in a scenario, in which a data stream comprises multiple substreams, or in scenarios, in which an entity combines multiple data streams. If this entity is not the entity that encoded the original data stream, and if recalculation of digital signatures which allow a verification of the data streams, shall be avoided, new solutions are needed to allow for a reliable verification of data streams.

SUMMARY

Embodiments according to a first aspect of the invention rely on the idea to include, into the data stream, an indication which indicates whether a segment of a temporal sequence of segments of the data stream is the first segment of assigned subsequence of the temporal sequence, or, in a second alternative of the first aspect, whether this segment is the last segment of assigned subsequence of the temporal sequence. The indication, which indicates whether the segment is the first/the last segment of assigned subsequence, it is used for forming a verification string to be verified using a digital signature. Signaling the starting point of a signed subsequence of the sequence of temporal segments allows the receiver to recognize the start of a signed subsequence, so that, for example, in a scenario, in which two bitstreams are concatenated, the receiver may treat the first segment appropriately in the trustworthiness check, that is, independence on whether or not the current segment is the first segment of a signed subsequence. For example, in order to verify a temporal consistency of the temporal sequence of segments, the verification of a current segment may include a hash value obtained from a preceding segment so that the trustworthiness check is able to verify whether the succession of the temporal segments within the sequence is authentic. If the receiver is not aware that the current segment is the first segment of a signed subsequence, the receiver might include the hash value of the preceding segment into the trustworthiness check, and as a result, the trustworthiness check will yield a negative result. In response to the indication that the current segment is the first segment of a signed subsequence, the receiver may perform the trustworthiness check independent of the preceding segments. Accordingly, the indication that the segment is the first segment of a signed subsequence allows a reliable verification of a concatenated data stream, into which independently signed subsequences are concatenated. It is noted that the above-mentioned example of how to verify the succession of temporal segments in a data stream is merely exemplary, and that alternative schemes for verifying sequences of signed segments may be used to which the idea underlying the embodiments of the first aspect are applicable in an equivalent manner. Indicating in the data stream that the current segment is the last segment of a signed subsequence, ensures that the sequence cannot be shortened without the shortening being recognized by the receiver. For example, if the data stream ends without the receiver having received a temporal segment, which is indicated to be the last segment of the signed subsequence, the receiver is aware that trailing segments were dropped.

The wording verification of a data stream and the wording checking a data stream on trustworthiness are used in an interchangeable manner in the following, and, for example, relate to a verification that the content of a data stream corresponds to the content as provided by a content provider that signed the content using a certificate.

Embodiments according to the first aspect provide an apparatus for decoding a data stream, the data stream comprising a temporal sequence of segments. The apparatus is configured for, for a segment of the sequence of segments, determining a predetermined portion of the segment; deriving, from the data stream, an indication which indicates whether the segment is the first segment of a signed subsequence of the temporal sequence, or whether the segment is the last segment of a signed subsequence of the temporal sequence; and deriving, from the data stream, a digital signature, which is for being checked against a verification string obtained based on the predetermined portion and based on the indication.

Embodiments according to the first aspect provide an apparatus for decoding a data stream. The apparatus is configured for checking the data stream on trustworthiness, the data stream comprising a temporal sequence of segments. The apparatus is configured for verifying a segment of the sequence of segments by subjecting a predetermined portion of the segment to a hash function to obtain a hash value; deriving, from the data stream, an indication which indicates whether the segment is the first segment of a signed subsequence of the temporal sequence, or whether the segment is the last segment of a signed subsequence of the temporal sequence; and forming a verification string based on the hash value and based on the indication; deriving a digital signature from the data stream and checking whether the verification string fits to the digital signature.

Embodiments according to the first aspect provide an apparatus for encoding a data stream. The apparatus is configured for rendering the data stream checkable on trustworthiness, and encoding, into the data stream, a temporal sequence of segments. The apparatus is configured for rendering a segment of the sequence of segments checkable on trustworthiness by subjecting a predetermined portion of the segment to a hash function to obtain a hash value; inserting, into the data stream, an indication which indicates whether the segment is the first segment of a signed subsequence of the temporal sequence, or whether the segment is the last segment of a signed subsequence of the temporal sequence; and forming a verification string based on the hash value and based on the indication; obtaining a digital signature based on the verification string.

Embodiments according to the first aspect provide a method for decoding a data stream, the data stream comprising a temporal sequence of segments, wherein the method comprises, for a segment of the sequence of segments, determining a predetermined portion of the segment; deriving, from the data stream, an indication which indicates whether the segment is the first segment of a signed subsequence of the temporal sequence, or whether the segment is the last segment of a signed subsequence of the temporal sequence; and deriving, from the data stream, a digital signature, which is for being checked against a verification string obtained based on the predetermined portion and based on the indication.

Embodiments according to the first aspect provide a method for decoding a data stream, wherein the method comprises checking the data stream on trustworthiness, the data stream comprising a temporal sequence of segments, wherein the method comprises verifying a segment of the sequence of segments by subjecting a predetermined portion of the segment to a hash function to obtain a hash value; deriving, from the data stream, an indication which indicates whether the segment is the first segment of a signed subsequence of the temporal sequence, or whether the segment is the last segment of a signed subsequence of the temporal sequence; forming a verification string based on the hash value and based on the indication; deriving a digital signature from the data stream and checking whether the verification string fits to the digital signature.

Embodiments according to the first aspect provide a method for encoding a data stream, wherein the method comprises rendering the data stream checkable on trustworthiness, and encoding, into the data stream, a temporal sequence of segments, wherein the method comprises rendering a segment of the sequence of segments checkable on trustworthiness by subjecting a predetermined portion of the segment to a hash function to obtain a hash value; inserting, into the data stream, an indication which indicates whether the segment is the first segment of a signed subsequence of the temporal sequence, or whether the segment is the last segment of a signed subsequence of the temporal sequence; forming a verification string based on the hash value and based on the indication; obtaining a digital signature based on the verification string (e.g., and inserting the digital signature into the data stream).

Embodiments according to the first aspect provide a data stream, the data stream being checkable on trustworthiness, the data stream comprising: a temporal sequence of segments; an indication which indicates whether the segment is the first segment of a signed subsequence of the temporal sequence, or whether the segment is the last segment of a signed subsequence of the temporal sequence.

Embodiments according to a second aspect of the invention rely on the idea of forming a verification string for a trustworthiness check of a segment of a sequence of segments of a data stream independent of a preceding segment, which directly precedes the segment in the temporal sequence, if a verification chain within the temporal sequence of segments is interrupted at the segment. To this end, a receiver, e.g., a decoder, of the data stream may derive from the data stream whether the verification chain is interrupted at the segment. For example, detecting an interruption may be performed based on an explicit signaling in the data stream, or alternatively, based on an implicit signaling, for example, by comparing verification parameters signaled for the individual segments of the temporal sequence. Detecting the interruption, and forming the verification string independent of the preceding segment allows a reliable trustworthiness check in scenarios, in which splicing of bitstreams occurs, that is, in scenarios, in which the sequence of segments in the data stream comprises segments, which do not belong to the same verification chain, e.g., in case that a jointly signed sequence of segments is interrupted by inserting an unsigned segment, or a segment belonging to a further verification chain, between two segments of the verification chain.

Embodiments according to the second aspect provide an apparatus for decoding a data stream, the data stream comprising a temporal sequence of segments. The apparatus is configured for: deriving, from the data stream, for a segment of the sequence of segments, whether a verification chain within the temporal sequence of segments is interrupted at the segment; and if the data stream indicates that the verification chain is interrupted, and if the data stream comprises a digital signature for checking the segment on trustworthiness, deriving, from the data stream, the digital signature, which is for being checked against a verification string, which is independent of a preceding segment, which directly precedes the segment in the temporal sequence.

Embodiments according to the second aspect provide an apparatus for decoding a data stream. The apparatus is configured for checking the data stream on trustworthiness, the data stream comprising a temporal sequence of segments. The apparatus is configured for: deriving, from the data stream, whether a verification chain within the temporal sequence of segments is interrupted at the segment; and if the data stream indicates that the verification chain is interrupted, and if the data stream comprises a digital signature for the segment: deriving the digital signature from the data stream; forming a verification string independent of a preceding segment, which directly precedes the segment in the temporal sequence; and checking whether the verification string fits to the digital signature.

Embodiments according to the second aspect provide an apparatus for encoding a data stream. The apparatus is configured for rendering the data stream checkable on trustworthiness, and encoding, into the data stream, a temporal sequence of segments. The apparatus is configured for, if a verification chain within the temporal sequence of segments is interrupted at the segment, and if the segment is to be rendered checkable on trustworthiness: forming a verification string independent of a preceding segment, which directly precedes the segment in the temporal sequence; and obtaining a digital signature based on the verification string; and inserting the digital signature into the data stream.

Embodiments according to the second aspect provide a method for decoding a data stream, the data stream comprising a temporal sequence of segments, wherein the method comprises: deriving, from the data stream, for a segment of the sequence of segments, whether a verification chain within the temporal sequence of segments is interrupted at the segment; and if the data stream indicates that the verification chain is interrupted, and if the data stream comprises a digital signature for checking the segment on trustworthiness, deriving, from the data stream, the digital signature, which is for being checked against a verification string, which is independent of a preceding segment, which directly precedes the segment in the temporal sequence.

Embodiments according to the second aspect provide a method for decoding a data stream, wherein the method comprises checking the data stream on trustworthiness, the data stream comprising a temporal sequence of segments, wherein the method comprises: deriving, from the data stream, whether a verification chain within the temporal sequence of segments is interrupted at the segment; and if the data stream indicates that the verification chain is interrupted, and if the data stream comprises a digital signature for the segment: deriving the digital signature from the data stream; forming a verification string independent of a preceding segment, which directly precedes the segment in the temporal sequence; and checking whether the verification string fits to the digital signature.

Embodiments according to the second aspect provide a method for encoding a data stream, wherein the method comprises rendering the data stream checkable on trustworthiness, and encoding, into the data stream, a temporal sequence of segments, wherein the method comprises, if a verification chain within the temporal sequence of segments is interrupted at the segment, and if the segment is to be rendered checkable on trustworthiness: forming a verification string independent of a preceding segment, which directly precedes the segment in the temporal sequence; and obtaining a digital signature based on the verification string; and inserting the digital signature into the data stream.

BRIEF DESCRIPTION OF THE DRAWINGS

Embodiments of the present invention will be detailed subsequently referring to the appended drawings, in which.

DETAILED DESCRIPTION OF THE INVENTION

Embodiments of the present invention are now described in more detail with reference to the accompanying drawings, in which the same or similar elements or elements that have the same or similar functionality have the same reference signs assigned or are identified with the same name. In the following description, a plurality of details is set forth to provide a thorough explanation of embodiments of the disclosure. However, it will be apparent to one skilled in the art that other embodiments may be implemented without these specific details. In addition, features of the different embodiments described herein may be combined with each other, unless specifically noted otherwise.

In the following description, when referred to a data stream, embodiments of the invention include the data stream being a media data stream having a media signal encoded there into, for example, a video data stream having a video encoded there into or an audio data stream having an audio signal encoded thereinto. In general, embodiments of the invention may be employed for any sequentially signaled data stream, e.g., a data stream having a sampled signal e.g., a sampled measurement signal encoded thereinto. According to an embodiment, the data stream has a waveform signal encoded thereinto, e.g., a biomedical waveform signal. Although some aspects of the invention will be described below with respect to a video data stream, these aspects may be applied to other types of data streams in an equivalent manner, unless explicitly indicated differently.

Figure 1:
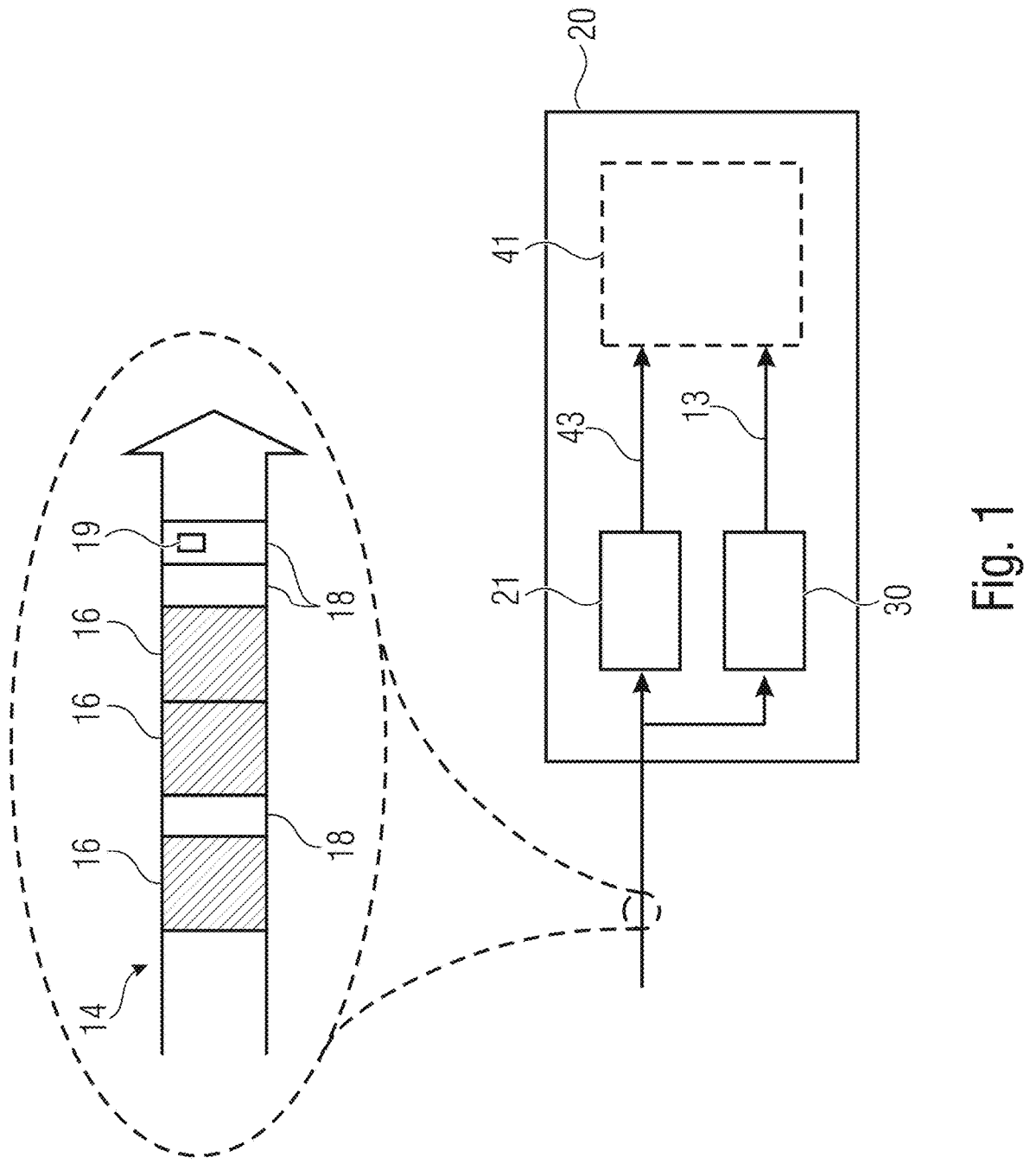
FIG. 1 illustrates an apparatus of decoding a data stream according to an embodiment.

FIG. 1 illustrates an apparatus 20 for decoding a data stream 14. Apparatus 20 may be referred to as a decoder 20. Data stream 14 may be a media data stream, e.g., a video data stream or an audio data stream, or any of the data stream types named above. For example, decoder 20 may decode a media signal, e.g., a video, or an audio signal, from the data stream 14. Decoder 20 comprises an extractor 21. Extractor 21 obtains a digital signature 43 based on the data stream 14. According to an embodiment, extractor 21 derives the digital signature 43 from the data stream 14. In other words, the digital signature 43 may be included in data stream 14. According to an alternative embodiment, data stream 14 includes an indication of a resource comprising the digital signature 43, and extractor 21 uses the indication of the resource for obtaining the digital signature 43 from the resource indicated in the data stream 14.

For example, the digital signature 43 is for checking the data stream on trustworthiness. In other words, the digital signature 43 may be for verifying the data stream 14, e.g., for verifying the trustworthiness of data stream 14.

Decoder 20 further comprises a portion determinator 30, which is configured for determining a predetermined portion 13 of the data stream 14, on which the checking of the data stream 14 on trustworthiness also referred to as trustworthiness check in the following, is to be performed. The digital signature 43 may be associated with the predetermined portion. In other words, the digital signature 43 may be for verifying the predetermined portion 13.

For example, the verification, or checking on trustworthiness, of data stream 14 may be performed portion wise, i.e., in units of portions of the data stream 14. Thus, the digital signature 43 may be for checking a portion of the data stream on trustworthiness, or in other words, for verifying a portion of the data stream 14.

The trustworthiness check, i.e., the checking of the data stream 14 or the predetermined portion 13 on trustworthiness, comprises checking whether the predetermined portion of the data stream 14 fits to, or matches, the digital signature 43.

According to an embodiment, decoder 20 comprises a verification module 41, which is configured for performing the trustworthiness check. As illustrated in FIG. 1, the verification module 41 receives the digital signature 43 and the predetermined portion 13 to perform the trustworthiness check. The verification module 41 is, as indicated in FIG. 1 by the dashed lines, an optional feature of apparatus 20.

In other words, according to an embodiment, decoder 20 is configured for checking the predetermined portion 13 of the data stream 14 on trustworthiness. In yet other words, according to an embodiment, decoder 20 is configured for checking whether the predetermined portion 13 of the data stream 14 fits to, or matches, the digital signature.

As already mentioned, the verification module 41 is optional in apparatus 20. According to an alternative embodiment, the trustworthiness check may be performed externally with respect to decoder 20. In other words, verification module 41 is not necessarily part of decoder 20, but may be part of a separate entity, such as an apparatus for checking the trustworthiness of data stream 14. For example, in this case, decoder 20 may provide or forward the digital signature 43 and the predetermined portion 13 to the trustworthiness check. For example, decoder 20 may gather information for the trustworthiness check, such as the digital signature 43 and the predetermined portion 13 and provide the gathered information for the trustworthiness check. For example, decoder 20 may form a concatenation of the information for the trustworthiness check. These alternative embodiments, in which the verification module 41 is not part of apparatus 20, may be embodied in combination with all embodiments of all aspects of the invention.

Further optional features of apparatus 20 of FIG. 1, which may apply to all embodiments described herein, are described in the following.

For example, the data stream 14 may comprise a plurality of packets. Portion determinator 30 may determine the predetermined portion 13 in a packet-wise manner, e.g., by including one or more of a plurality of packets.

For example, optionally, data stream 14 may comprise a plurality of payload packets 16. The payload packets 16 may carry payload data, e.g., the data to be transmitted by data stream 14. For example, in case that the data stream 14 is a media data stream, the payload packets 16 may carry coded media data, such as video data in the case that the data stream 14 is a video data stream. In other words, payload packets 16 may be coded video payload packets, e.g., video coded layer (VCL), network abstraction layer (NAL) units, carrying video data, e.g., encoded video data. For example, video data may refer to information, from which sample values of pictures of a video are reconstructed.

Data stream 16 may, optionally, further comprise supplemental information packets 18, which may alternatively be referred to as supplemental information payload packets, e.g., in contrast to coded data payload packets carrying the coded data. For example, in case of video data streams, in particular, in case of H.264, H.265, and H.266 can format video data streams, the supplemental information packets may be supplemental enhancement information (SEI) NAL units. For example, the supplemental information packets 18 are interspersed between the payload packets 16. The supplemental information packets 18 carry supplemental information messages 19. For example, the supplemental information messages 19 comprise information that assists in processes related to decoding, display or other purposes, but is not needed by the decoding process in order to determine the values of the samples in decoded pictures of a video.

In other words, for example, the supplemental information packets may carry information on coding options and information for the decoding process, but do not include encoded samples of the signal encoded into the data stream.

For example, each of the supplemental information messages may be associated with one of the payload packets.

For example, each of the supplemental information messages is associated with an associated one of the payload packets, e.g., the associated payload packet being part of the same sample of a sampled signal encoded into the data stream, e.g., of the same picture unit or the same access unit as the supplemental information packet.

The predetermined portion 13 may optionally comprise one or more supplemental information messages, which may be included in one or more supplemental information packages. In other words, optionally, the predetermined portion 13 may comprise one or more supplemental information packets.

For example, the predetermined portion 13 comprises all or a subset of the payload packets 16 of a segment of the data stream 14. For example, the predetermined portion 13 may include portions of the payload packets 16, e.g., a portion of each of the payload packets, which is to be included in the predetermined portion, or alternatively, may include the payload packets as their holes. The segment of data stream 14, from which the predetermined portion 13 may be determined, may be, for example, an independently coded sequence of the data stream 14, for example, a coded video sequence, CVS in case of a video data stream. In other examples, the segment, from which the predetermined portion 13 is determined, may be indicated in the data stream 14, e.g., by means of one or more indications, which associate packets of the data stream with the predetermined portion 13 and/or by indications, such as supplemental information messages, which indicate start and end of the segment, out of which the predetermined portion 13 is selected. For example, start and end may be indicated by respective supplemental information messages.

Figure 4:
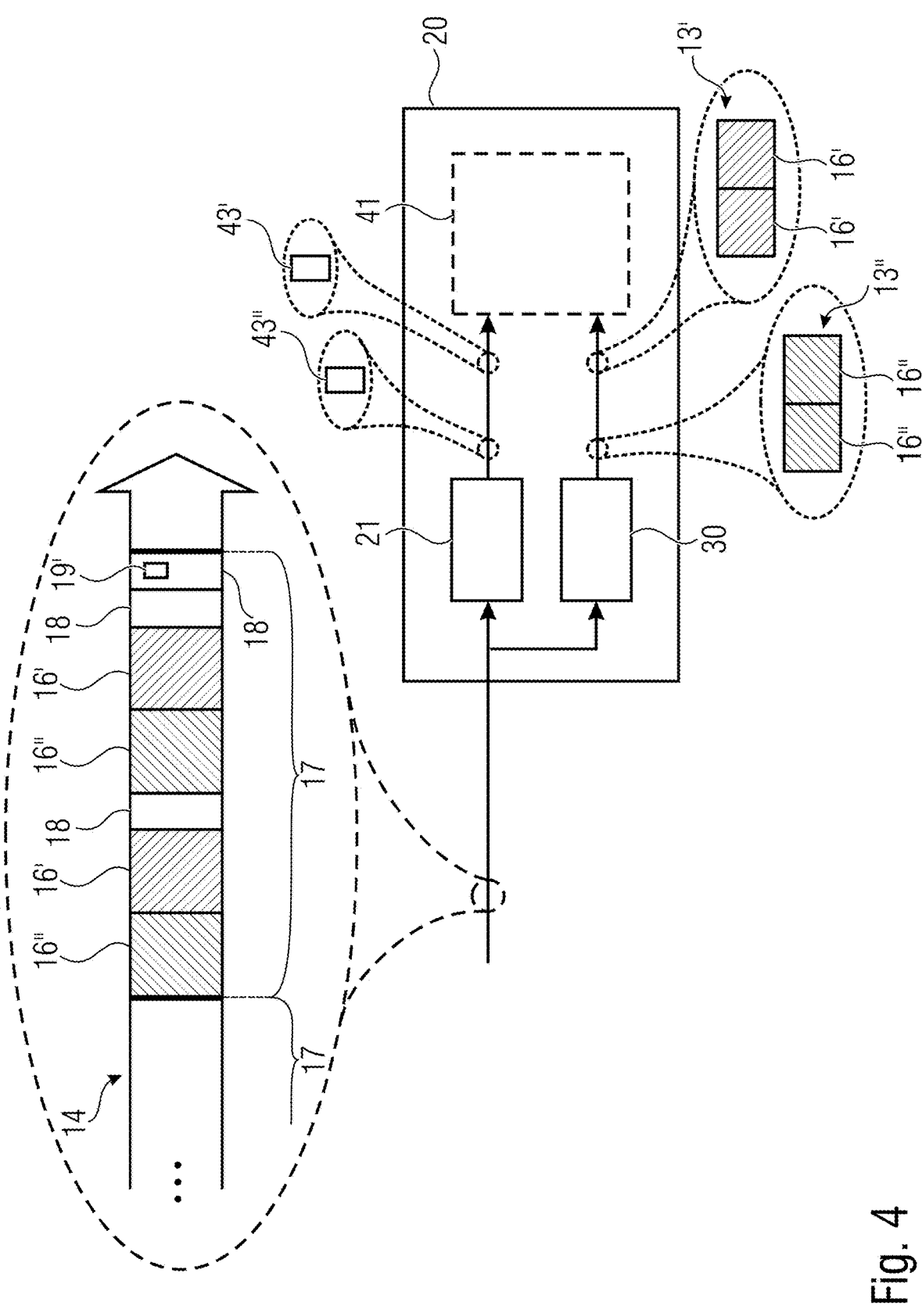
FIG. 4 illustrates a substream wise verification of a segment of a data stream according to an embodiment.

According to embodiments, data stream 14 may comprise, for the predetermined portion 13, or for a segment of data stream 14, which comprises the predetermined portion, e.g., a segment 17 described with respect to FIG. 4, a verification parameter set, which comprises verification parameters for verifying the predetermined portion. For example, the verification parameter set may may be indicative of one or more of a hash function for performing the trustworthiness check of the predetermined portion 13 (e.g., hash function 31 described with respect to FIG. 2), a certificate for decrypting the digital signature 43 for performing the trustworthiness check of the predetermined portion 13, an identifier, which associates the predetermined portion to a media asset, an indication of how to derive the predetermined portion 13. The verification parameter set may be signaled in a supplemental information message, which, for example, may correspond to the DSC ISCI message described below. For example, indication 51 may be included in the verification parameter set.

Figure 2:
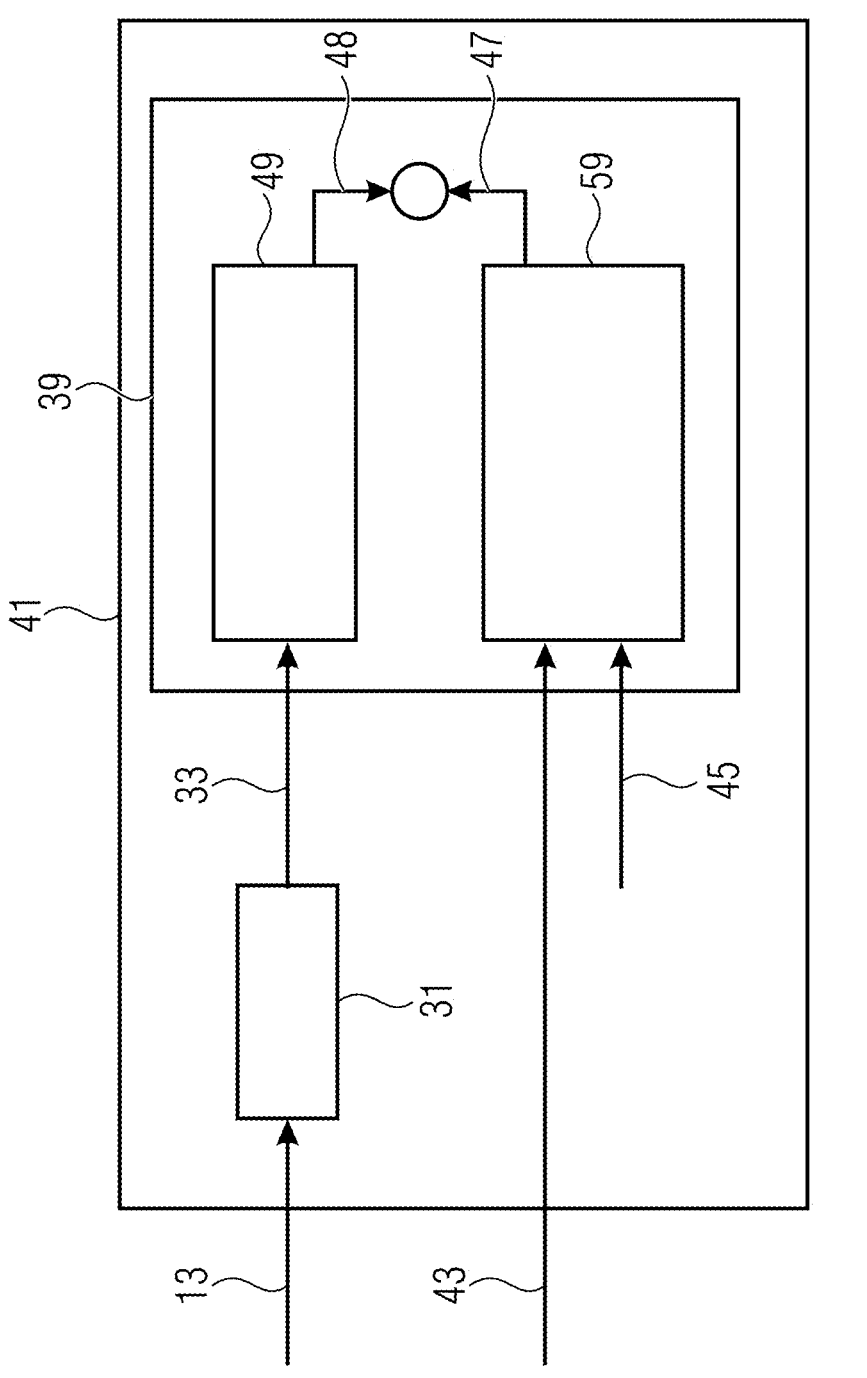
FIG. 2 illustrates a verification module according to an embodiment.

FIG. 2 illustrates an embodiment of the verification module 41, as it may optionally be part of decoder 20. Alternatively, the trustworthiness check described with respect to a verification module 41 may be performed externally to decoder 20. According to the embodiment of FIG. 2, the trustworthiness check, or the checking whether the predetermined portion 13 of the data stream 14 fits to the digital signature 43, comprises subjecting the predetermined portion 13 to a hash function 31 to obtain a hash value 33. According to this embodiment, verification module 41 further comprises a verification block 39, which checks whether the hash value 33 fits to the digital signature 43.

In the following, further optional features of the verification module 41 are described.

According to an embodiment, verification block 39 comprises a verification string former 49, which is configured for forming a verification string, e.g., IdString of the sample syntax described below, based on the hash value 33. For example, verification string former 49 may form a concatenation comprising the hash value 33, and optionally, further information, such as one or more of a media asset identifier, identifying a media asset, to which the media of the predetermined portion 13 belongs, and identifier of an algorithm of the hash function 31, and a further hash value, for example, obtained from a previous portion of the data stream 14. According to this embodiment, verification block 39 comprises a decryption block 59, which decrypts the digital signature 43 to obtain a check value 47, and verification block 39 checks whether the verification string 48 matches the check value 47.

For example, decryption module 59 may use a public key 45 of an asymmetric cryptography scheme for decrypting the digital signature 43. For example, extractor 21 may derive the public key 45 based on an indication in data stream 14, for example, a resource identifier, which indicates a resource, from which the public key 45 may be derived, and deriving the public key 45 from the resource indicated in data stream 14.

In other words, according to an embodiment, verification block 39 performs the checking whether hash value 33 fits to the digital signature 43 by forming a verification string based on the hash value and, optionally, based on further information, and comparing the verification string to the digital signature 43 using a public key (wherein comparing the verification string to the digital signature may include the decrypting performed by decrypting block 59).

According to alternative embodiments, all or a part of the above-mentioned further information, which is used for deriving the verification string 48, may be concatenated with the predetermined portion 13 and subjected to the hash function 31 to obtain the hash value 31. In other words, according to these alternative embodiments, all or a part of the further information, e.g., the hash function identifier and/or the further hash value or digital signature of a previous segment or previous portion, is used for deriving the verification string, and is thus reflected in the verification string, by hashing this information together with the predetermined portion 13, and thus, deriving the hash value 33 based on this information.

For example, the generation of the digital signature 43 may be performed on encoder side by forming a verification string and signing it using a private key of an asymmetric encryption scheme.

For example, the singing may include a further hashing, i.e., hashing the verification string using a further hash function to obtain a further hash value and signing the further hash value. In this example, it may be impossible to reconstruct the verification string from the digital signature 43 on decoder side, but instead, it can only be checked, if a check value formed using the hash value 33 fits to the digital signature, e.g., by deriving the check value by forming the verification string and hashing the verification string using the further hash function. In other words, in this case, the verification by verification block 39 may include a hashing of the verification string using the further hash function to obtain a further hash value, and checking, if the further hash value fits to the digital signature, e.g., by decrypting the digital signature using the public key and checking if the resulting check value equals the further hash value.

In other words, according to an embodiment, the checking whether the hash value 33 fits or matches the check value 47 may include forming a verification string using the hash value 33, e.g., by concatenating the hash value 33 with further information, such as a further hash value or a hash function identifier as will be described below, and hashing the verification string, e.g., using a further hash function. Verification block 39 may then check, whether the hashed verification string equals the check value 47 decrypted from the digital signature. On encoder side, according to this embodiment, the digital signature may be generated by forming the verification string as on decoder side, hashing it using the further hash function, and signing the hashed verification string to obtain the digital signature 43.

According to alternative embodiments, the check value 47 may correspond to the verification string, e.g., the hash value 33 or the concatenation of the hash value 33 with further information, such as a further hash value or a hash function identifier. In other words, the decryption of the digital signature in this case may yield the hash value 33 as part of the check value 47 (or the entire check value 47). In this case, due to the omittance of a further hashing, the digital signature may be larger.

For example, if one or the other of the above alternatives is employed may depend on the selected hash function.

Figure 3:
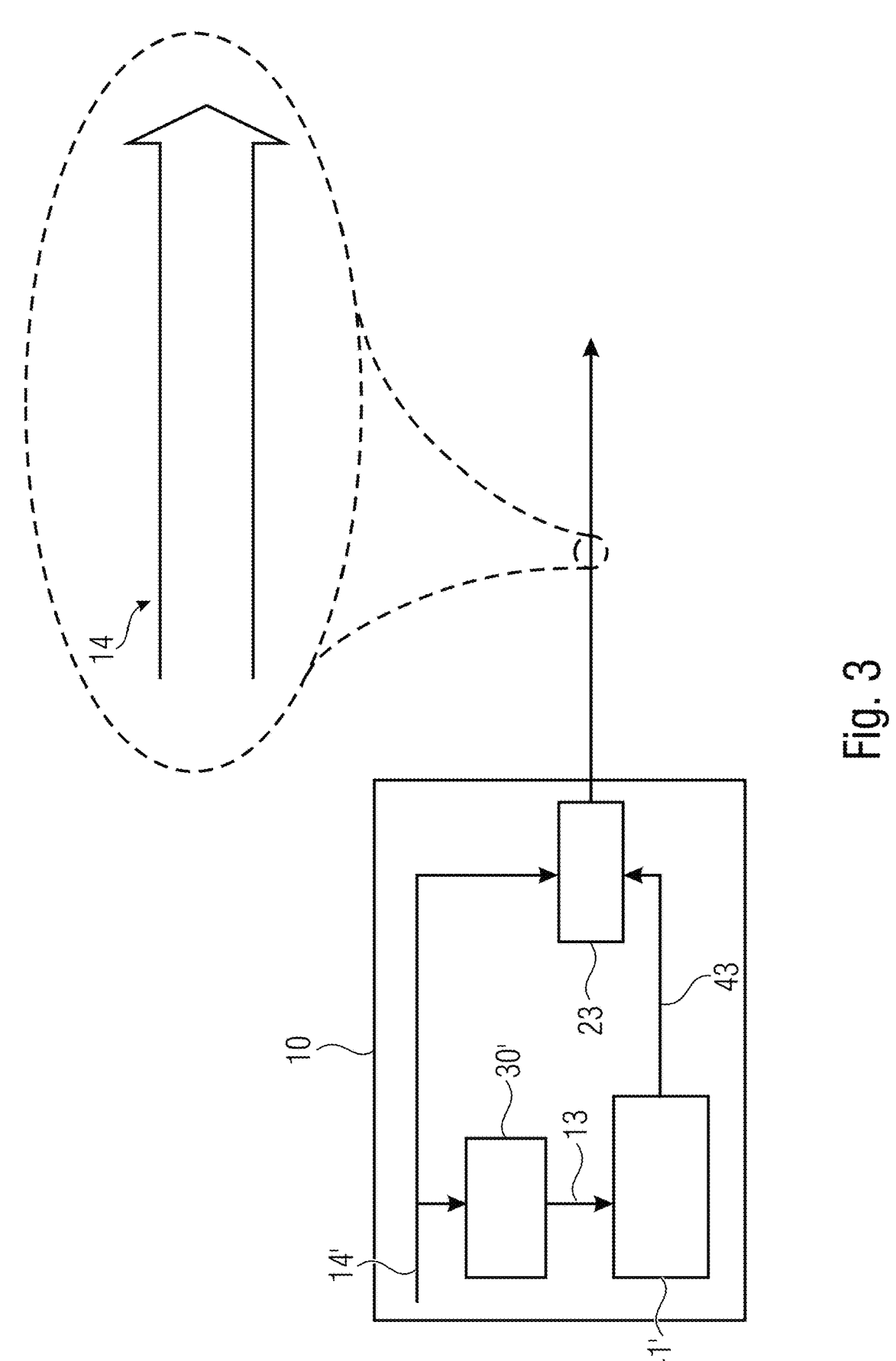
FIG. 3 illustrates an apparatus for encoding a data stream according to an embodiment.

FIG. 3 illustrates an apparatus 10 for encoding a data stream 14. Apparatus 10 may be referred to as encoder 10. Apparatus 10 is configured for rendering the data stream 14 checkable on trustworthiness. Encoder 10 provides data stream 14 by inserting, e.g., encoding, into the data stream 14, a plurality of payload packets 60 carrying payload data and supplemental information packets 18 carrying supplemental information messages 90. In other words, encoder 10 may provide the data steam 14 as described with respect to FIG. 1. For example, encoder 10 comprises inserter 23, which inserts the payload packets and the supplemental information packets into data stream 14.

Encoder 10 comprises a verification module 41', which obtains a digital signature 43 based on a predetermined portion of the data stream 14. Encoder 10 further comprises a portion determinator 30', which determines the predetermined portion 13. For example, portion determinator 30' determines, based on data 14', which is to be inserted into data stream 14, the predetermined portion 13, e.g., by including a portion of data 14' into the predetermined portion 13, which corresponds to the predetermined portion 13 determined by portion determinator 30.

Any description of apparatus 20 may optionally apply to encoder 10 in the sense that an information derived from data stream 14 by apparatus 20 may be inserted into data stream 14 by apparatus 10. Furthermore, for example, any hash function used by verification module 41 such as hash function 31, may be equivalent to a corresponding hash function used by the verification module 41'. Same applies to the input of corresponding hash functions, such as hash function 31 used for deriving the hash value 33.

The interplay between verification module of decoder 20 and verification module 41' of encoder 10 was already briefly described above. Verification module 41' may for a verification string comprising a hash value derived by subjecting the predetermined portion 13 to a hash function. Verification module 41' may further sign the verification string, e.g., using a private key of the above-mentioned asymmetric cryptography scheme in order to generate the digital signature 43.

For example, the digital signature 43 may be inserted into data stream 14 by inserter 23, alternatively, inserter 23 may insert an indication of a resource, from which the digital signature 43 may be derived, into the data stream 14.

Any description of apparatus 20 may optionally equivalently apply to apparatus 10 in the sense that an information derived from data stream 14 by apparatus 20 may be inserted into data stream 14 by apparatus 10. Furthermore, any hash function such as hash function 31, used by apparatus 10 may be equivalent to the corresponding hash function used by apparatus 20. Same applies to the input of the corresponding hash functions, such as hash function 31 used for deriving hash value 33. The generation of digital signature 43 and the verification performed by apparatus 20 using the digital signature 43, respectively, may be part of an asymmetric cryptography scheme, and these steps may be performed by means of a pair of private and public keys, respectively, wherein at least the private key is used for signing to generate a digital signature 43, and wherein the public key is used for decrypting, in order to verify the verification string formed on receiver side against the digital signature 43.

FIG. 4 illustrates a further embodiment of decoder 20. In the features described with respect to FIG. 4, may optionally be combined with any of the previously described embodiments of decoder 20. According to the embodiment of FIG. 4, the trustworthiness check is performed in units of portions 13', 13". In other words, according to this embodiment, the data stream 14 comprises a number of portions, in units of which the data stream 14 is verifiable. For example, data stream 14 comprises a respective digital signature for each of the portions. Optionally, data stream 14 may comprises the above-mentioned verification parameter set for each of the portions. Alternatively, the verification parameters for all of the portions of one segment, or a subset of the portions, may be included in a common verification parameter set. The predetermined portion 13 described above may be one of the number of portions. Each of the portions may be defined by having one or more packets, or data included in the packets, assigned thereto.

For example, in FIG. 4, payload packets 16' are assigned to the portion 13', and payload packets 16" are assigned to portion 13". Performing the verification of data stream 14 in units in portion may comprise determining the respective portion, e.g., portion 13' and portion 13" in FIG. 4, and subject the respective portions to the trustworthiness check 41. To this end, data stream 14 may indicate respective digital signatures for the portions, e.g., digital signature 43' for portion 13' and a digital signature 43" for portion 13" in FIG. 4. For example, the portions as described with respect to FIG. 4 may be referred to as substreams or verification substreams of data stream 14.

For example, in case of video data streams, different layers of a layered video data stream may be assigned to different substreams. For example, different layers may carry different representations of a video encoded into video data stream 14, e.g., having different spatial resolutions, carrying different types of data such as texture and depth or may carry different views of a scene. As a further example, different substreams may be associated with different temporal layers of a media data stream, each of the temporal layers carrying samples for forming representations of the encoded media signal at different temporal resolutions, e.g., so that when combining different temporal layers a higher temporal resolution is obtained. However, it is noted that these are only examples of organizing data of a media data stream in different substreams, and the association between packets and substreams may be up to the encoder or the entity rendering the data stream 14 checkable on trustworthiness.

In other words, data stream 14 may comprise, for each of the number of portions, in units of which the data stream is verifiable, a respective digital signature, or alternatively, comprise an indication of a respective digital signature.

According to embodiments, in addition to the data stream being verifiable in units of the above-described portions in the sense of substreams, the trustworthiness check may be performed in units of segments 17 of a temporal sequence of segments of data stream 14. Segments may be referred to as verification periods. In other words, within one segment of data stream 14, multiple substreams, e.g., the above-described portions 13', 13", may be defined, in units of which the segment is verifiable, the packets or data belonging to each of the substreams not necessarily forming a contiguous part of data stream 14, but rather, within one segment, packets or pieces of data may be individually assigned to one of the substreams. In the following, only one segment 17 is considered, that is, for example, when referring to portions, it may be referred to the above-described substreams within one segment 17. For example, in the embodiments described with respect to the first and second aspect, the predetermined portion 13 may be a portion of one segment 17 of data stream 14.

According to an embodiment, data stream 14 comprises an indication of the count of substreams of the data stream, e.g., within one segment, e.g., only one segment of data streams is considered as the data stream.

According to an embodiment, extractor 21 derives the number of portions, e.g., the count of substreams of the data stream, from data stream 14, e.g., by deriving the indication of the number of portions from the data stream 14. According to this embodiment, portion determinator 30 may assign each of the payload packets 16 to one of the portions, e.g., to one out of one or more of the portions, i.e., not necessarily to each of the portions.

In the following, embodiments of the first aspect of the invention are described.

Figure 5:
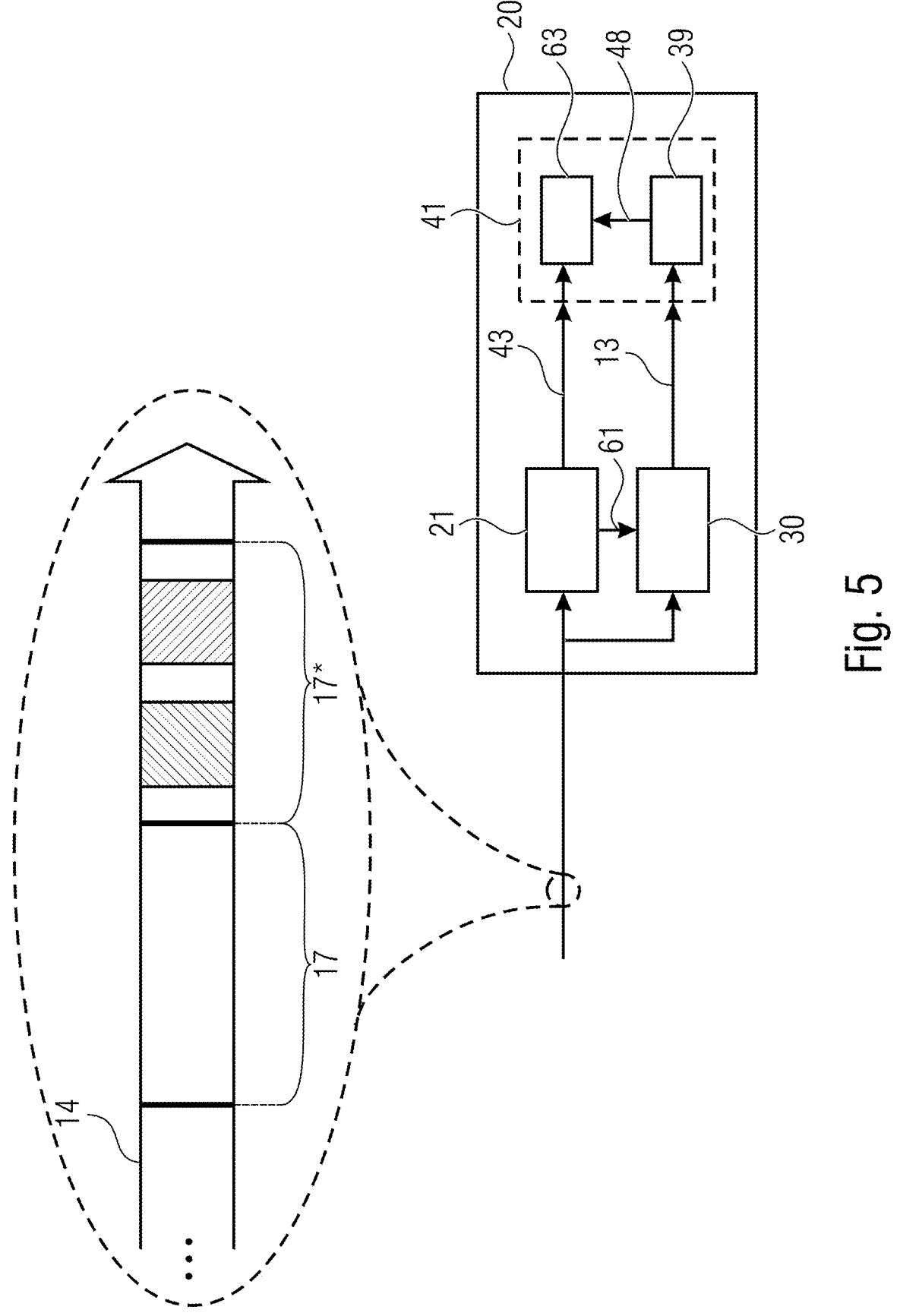
FIG. 5 illustrates an apparatus for decoding a data stream according to an embodiment of the first aspect.

FIG. 5 illustrates an apparatus 20 for decoding a data stream 14 according to an embodiment of the first aspect of the invention. Apparatus 20 of FIG. 5 may optionally be an embodiment of apparatus 20 of FIG. 1, that is, apparatus 20 of FIG. 5 may be based on any of the embodiments described with respect to FIGS. 1 to 4. The features described with respect to FIG. 4 may optionally apply to embodiments of the first aspect.

According to embodiments of the first aspect, the data stream comprises a temporal sequence of segments 17 17*, e.g., as described with respect to FIG. 4. For example, the segments form a temporal sequence with respect to the signal encoded into the data stream 14, for example, with respect to a temporal order of samples of the signal, such as a presentation order or presentation time assigned to the samples. For example, the segments may be video segments forming a temporal sequence with respect to a presentation order or presentation time assigned to the video segments. For example, each of the segments 17 may be a coded video sequence, CVS. According to the embodiment of FIG. 5, portion determinator 30 determines the predetermined portion 13 out of one of the segments 17*, which is to be checked on trustworthiness, e.g., as described above. As already mentioned, the predetermined portion 13 is not necessarily a continuous portion of segment 17*, but may have assigned individual packets or pieces of data, as it is illustrated by means of the hashed portions of segment 17* in FIG. 5.

According to embodiments of a first alternative of the first aspect, for a trustworthiness check of a segment 17*, extractor 21 derives, from data stream 14, an indication 61, which indicates whether the segment 17* is the first segment of a signed subsequence of the temporal sequence. For example, indication 61 may be a syntax element signaled in data stream 14, e.g., a flag, e.g., DSCI_first_signed_segment_flag described below.

According to embodiments of a second alternative of the first aspect, indication 61 indicates whether the segment is the last segment of a signed subsequence of the temporal sequence. For example, indication 61 may be a syntax element signaled in data stream 14, e.g., a flag, e.g., DSCI_last_signed_segment_flag described below.

Figure 7:
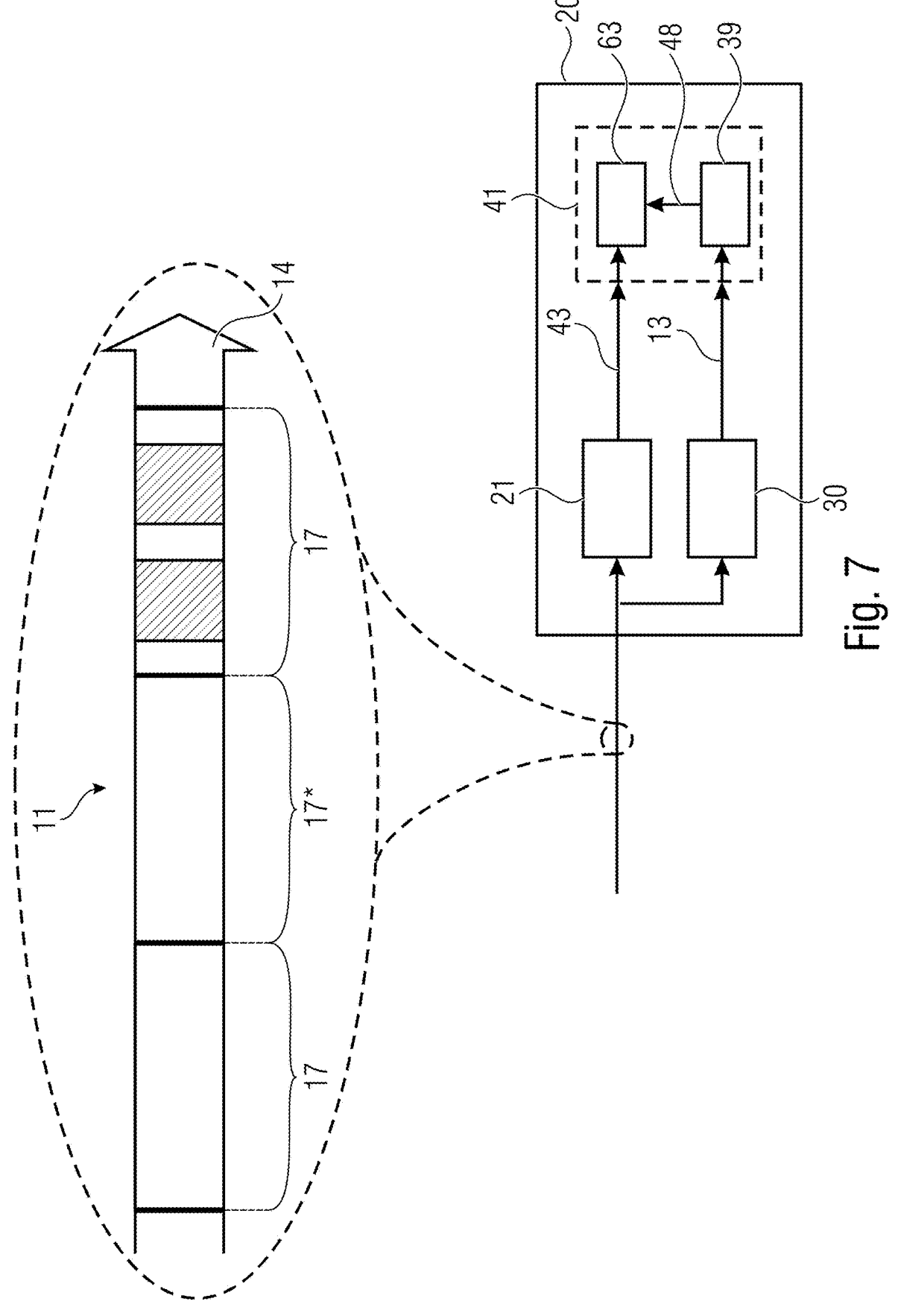
FIG. 7 illustrates an apparatus for decoding a data stream according to the second aspect.

According to embodiments of the first aspect, the indication 61 is included in the verification of the predetermined portion 13. In other words, indication 61 may be included in the determination of the verification string 48 performed by verification string former 39 of FIG. 5. In the trustworthiness check 41, as illustrated in FIG. 5, in block 39, the verification string 48 is formed based on the predetermined portion 13 and based on the indication 61. For example, block 39 may include blocks 31 and 49 of FIG. 2. Block 63 of the trustworthiness check 41 as illustrated in FIG. 7 checks whether the verification string 48 fits to the digital signature 43. For example, block 63 may include blocks 59 and the comparison between the check value 47 and the verification string 48 of FIG. 2. According to an embodiment, the verification string 48 is formed by combining, e.g., concatenating hash value derived by subjecting the predetermined portion 13 to a hash function. According to another embodiment, a combination, e.g., concatenation of indication 61 and the predetermined portion 13 is subjected to the hash function to obtain the hash value, which is used for forming the verification string 18. In other words, the indication may be included in the predetermined portion 13.

In other words, for example, the verification string, may reflect, or depend on, both the hash value 31 and the indication 61. For example, the verifications therein comprise the hash value 31 and the indication 61, e.g., a value or a flag representing the indication 61.

In other words, an embodiment of the invention is an apparatus 20 for decoding a data stream, the data stream comprising a temporal sequence of segments 17 (e.g., coded video sequences, CVSs) (E.g., the video segments form a temporal sequence with respect to a presentation order or presentation time assigned to the video segments of the temporal sequence), wherein the apparatus is configured for, for a segment of the sequence of segments: determining 30 a predetermined portion 13 of the segment; deriving 21, from the data stream, an indication 61 (e.g., a syntax element, e.g., a flag, e.g., dsci_last_signed_segment_flag) which indicates i) whether the segment is the first segment of a signed (or verifiable) subsequence of the temporal sequence, or ii) whether the segment is the last segment of a signed (or verifiable) subsequence of the temporal sequence; and deriving 21, from the data stream, a digital signature 43, which is for being checked against a verification string 48 obtained based on the predetermined portion 13 and based on the indication 61 (e.g., the verification string reflects, or depends on, the hash value and the indication, e.g., the verification string comprises the hash value and the indication, e.g., a value of a flag representing the indication).

According to an embodiment, the apparatus is configured for verifying the predetermined portion 13 by checking whether the verification string 48 fits to (or matches) the digital signature 43 (e.g., in order to check the data stream, or the predetermined portion 13 thereof, on trustworthiness).

According to an embodiment, the apparatus is configured for providing (or forwarding) the predetermined portion 13, the indication 61 and the digital signature 43 for a verification of the predetermined portion 13 (e.g., performed by a further apparatus or entity) (E.g., the verification comprises checking whether the predetermined portion 13 of the data stream fits to (or matches) the digital signature 43).

According to an embodiment, the predetermined portion 13 is to be subjected to a hash function to obtain a hash value, and wherein the verification string 48 is obtained based on the hash value.

According to an embodiment, the predetermined portion 13 and the indication (e.g., a concatenation thereof) are to be subjected to a hash function to obtain a hash value, and wherein the verification string 48 is obtained based on the hash value.

In other words, an embodiment of the invention is an apparatus 20 for decoding a data stream 14, wherein the apparatus is configured for checking the data stream on trustworthiness (e.g., apparatus for verifying a data stream), the data stream comprising a temporal sequence of segments 17 (e.g., segments of encoded payload data, e.g., coded video sequences, CVSs) (E.g., the segments form a temporal sequence with respect to a presentation order or presentation time assigned to the segments of the temporal sequence), wherein the apparatus is configured for verifying a (e.g., current or predetermined) segment 17* of the sequence of segments by: subjecting a predetermined portion 13 of the segment to a hash function 31 to obtain a hash value 33; deriving 21, from the data stream, an indication 61 (e.g., a syntax element, e.g., a flag, e.g., dsci_last_signed_segment_flag) which indicates i) whether the segment is the first segment of a signed (or verifiable) subsequence of the temporal sequence, or ii) whether the segment is the last segment of a signed (or verifiable) subsequence of the temporal sequence; forming a verification string 48 based on the hash value 33 and based on the indication 61 (e.g., the verification string reflects, or depends on, the hash value and the indication, e.g., the verification string comprises the hash value and the indication, e.g., a value of a flag representing the indication); deriving a digital signature 43 from the data stream and checking whether the verification string 48 fits to the digital signature 43.

Further optional details of embodiments of the first aspect will be described in the following.

According to an embodiment, indication 61 is included in data stream 14 in a supplemental information message, which is associated with the segment 17*, e.g., the DSCI SEI messages described below.

For example, the indication 61 may be part of the above-described verification parameter set. Alternatively, the indication 61 may be part of a supplemental information message carrying the digital signature 43, e.g., DSCV SEI message described below.

In other words, according to an embodiment of the first alternative of the first aspect, the supplemental information message comprising indication 61 precedes the predetermined portion 13 in data stream 14. According to an embodiment of the second alternative of the first aspect, the supplemental information message comprising the indication 61 succeeds the predetermined portion 13 in data stream 14, or precedes the ultimate payload packet of the predetermined portion 13 in data stream 14.

According to an embodiment of the first alternative of the first aspect, the trustworthiness check 14 of the predetermined portion 13 of the segment 17*, is performed in a manner that if the segment 17* is the first segment of the signed subsequence, verification string 48 is formed independent of any segment of the data stream 14, which segment precedes the segment 17* in the temporal sequence.

For example, if the segment is not the first segment of the signed subsequence, the verification string 48 may be formed using a previous hash value obtained for a preceding segment, which precedes segment 17* in the sequence of segments of the data stream 14. For example, when referring to "the preceding segment", it is referred to the segment which directly precedes segment 17*, i.e., the segment which is currently checked on trustworthiness.

In other words, the indication, which indicates if the segment 17* is the first segment of the signed subsequence provide the decoder, or an apparatus for checking trustworthiness of the data stream 14, information, whether the current segment is the first segment of a signed subsequence, thereby allowing the entity performing the trustworthiness check to infer whether a hash value from a previous segment is to be included into the trustworthiness check in order to successfully verify the digital signature for the current segment 17*. For example, in order to not only verify the individual segments, but to provide a verification of the temporal consistency of the sequence of temporal segments, e.g., to verify that no segment was canceled or no additional segment was added, the verification of a segment may include the hash value of a previous segment into the verification string for a currently checked segment.

A receiver switching into a steam, does not necessarily know whether a currently receive segment is the first segment of a signed subsequence of the media data stream. The indication indicating whether the segment is the first segment or not allows the receiver to infer, that it is not able to perform the trustworthiness check in case that the segment is not the first segment and the receiver is not in possession of the preceding segment. In case that the segment is the first segment, the receive knows from indication 61 that the trustworthiness check is to be performed in dependent of previous segments and that it can perform the trustworthiness check. Thus, if the trustworthiness check fails, the receiver knows that the segment is not trustworthy. Even further, if two data stream are concatenated, and if there is no indication in the data stream which indicates the switch from the first data stream to the second data stream, the receiver would assume that the first segment of the second data stream is to be verified using a hash value of the last segment of the first data stream. However, if these two data streams are rendered checkable on trustworthiness independently from each other, such a check would fail and the receiver would identify a verification problem for the first segment of the second data stream. Having the information that the segment is the first segment of the second data stream, a receiver according to an embodiment of the present invention would perform the trustworthiness check independent of the first data stream, so that the check can be successful.

The presence of the indication that a segment is the last segment of the signed subsequence prevents an unnoticed shortening of the data stream.

As already described with respect to FIG. 4, data stream 14, or segments thereof, may optionally be verifiable in units of portions, also referred to as substreams. According to embodiments of the first aspect, segment 17* is verifiable in units of a number of portions, which have a hierarchical order.

According to an embodiment, if the predetermined portion 13 is not the first portion within the hierarchical order among the portions, the trustworthiness check 41 performs the verification string 48 further based on a previous hash value obtained for a preceding portion of segment 17*, which precedes the predetermined portion 13 in the hierarchical order. For example, the preceding portion may be a portion, on which the trustworthiness check of the predetermined portion depends, in other words, the trustworthiness check for the predetermined portion 13 references the preceding portion.

According to an embodiment, in case that the predetermined portion 13 is the first portion within the hierarchical order among the portions, e.g., a lowest ranked portion as described above, the verification of a subsequent portion of the predetermined portion 13 out of the number of portions, the subsequent portion following the predetermined portion 13 in the hierarchical order, e.g., directly or indirectly, the trustworthiness check 41 forms the verification string 48 for verifying the subsequent portion based on the hash value obtained by subjecting the predetermined portion 13 to the hash function.

According to embodiments, the indication 61, which indicates whether the segment 17* is the first segment in the signed subsequence, is selectively signaled, e.g., only signaled if the predetermined portion 13 to be verified is the first portion within the hierarchical order of the number of portions. Same may apply if the indication 61 indicates whether the segment 17* is the last segment of the signed subsequence. This conditional signaling is particularly beneficial, if the indication 61 is signaled in a syntax structure, which is specific for an individual portion within the segment 17*, e.g., a syntax structure that is signaled for each of the number of portions of segments 17*, such as, e.g., the DSCV SEI message described below. Conditionally signaling the indication 61 only for the first portion, e.g., the lowest ranked substream, prevents signaling the information, which is the same for all portions of the segment, multiple times.

In other words, in verifying a portion of the number of portions, which is not the first portion within the hierarchical order, apparatus 20 may refrain from deriving the indication 61 from the data stream 14.

Figure 6:
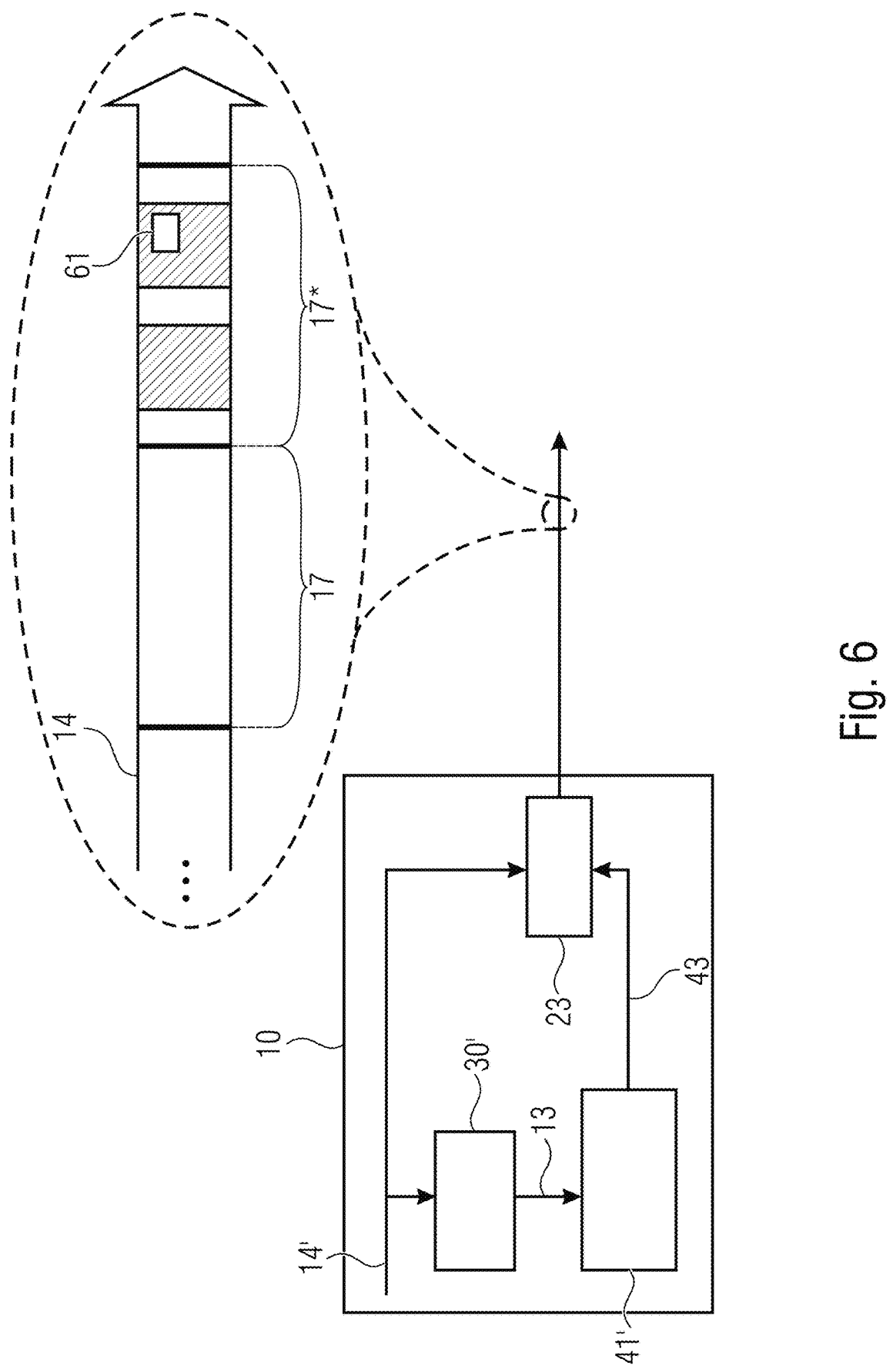
FIG. 6 illustrates an apparatus for encoding a data stream according to the first aspect of the invention.

FIG. 6 illustrates an apparatus 10 for encoding a data stream according to an embodiment of the first aspect. Apparatus 10 of FIG. 6 may optionally correspond to apparatus 10 of FIG. 3, that is, apparatus 10 of FIG. 6 may be based on any of the embodiments described with respect to FIGS. 1 to 3. According to the embodiment of FIG. 6, encoder 10 renders the data stream 14 checkable on trustworthiness, see verification module 41'.

Inserter 23 of encoder 10 encodes a temporal sequence of segments 17, 17* into the data stream 14. Apparatus 10 renders a current segment 17* of the sequence of segments checkable on trustworthiness by subjecting a predetermined portion 13 of the segment 17* to a hash function 31 to obtain a hash value 33. Inserter 23 of apparatus 10 inserts indication 61 into data stream 14, the indication 61 indicating, in a first alternative, whether the current segment 17* is the first segment of a signed subsequence of the temporal sequence, or, in a second alternative, wherein the current segment 17* is the last segment of a signed subsequence of the temporal sequence. Verification string 48, according to this embodiment, is formed based on the predetermined portion 13 and based on the indication 61., e.g., as described with respect to verification module 41 of FIG. 5. The verification string is used for obtaining the digital signature 43, for example, by signing the verification string 43 using the private key of an asymmetric cryptography scheme. Inserter 23 inserts the digital signature 43, or an indication thereof into the data stream 14.

By making the verification string dependent on the indication 61, the indication 61 is prevented from being corrupted, e.g., amended in an unauthorized manner which could undermine the trustworthiness check, and in particular, the benefits including the indication 61 in the data stream 14, which benefits were described above.

In the following, embodiments of the second aspect of the invention are described.

FIG. 7 illustrates an apparatus 20 for decoding a data stream 14 according to an embodiment of the second aspect of the invention. Apparatus 20 according to FIG. 7 may optionally an embodiment of apparatus 20 of FIG. 1, that is, any of the details described with respect to FIGS. 1 to 3 may optionally be implemented in the apparatus 20 of FIG. 7. Furthermore, features described with respect to FIG. 4 and FIG. 5 may optionally be implemented in the apparatus of FIG. 7.

According to the embodiment of FIG. 7, the data stream 14 comprises a temporal sequence of segments 17, 17*, e.g., as described with respect to FIG. 4 or FIG. 5. According to FIG. 7, apparatus 20 derives, from the data stream 14 for a segment 17* of the sequence of segments, which is currently to be checked on trustworthiness, whether a verification chain within the temporal sequence of segments is interrupted at the segment. If the apparatus 20 comes to the result that the verification chain is interrupted at the segment, and if the data stream 14 comprises a digital signature 43 for checking the segment 17* on trustworthiness, extractor 21 extracts the digital signature 43 from the data stream 14 to provide the digital signature 43 for the trustworthiness check 41. The trustworthiness check 41 may be performed as described above, but according to embodiments of the second aspect, the forming of the verification string 48 is performed independent of a preceding video segment, which directly precedes the currently checked segment in the temporal sequence if the verification chain is interrupted at the current segment.

For example, the verification chain is a signed subsequence of the temporal sequence of segments. For example, an interruption may occur in cases in which the data stream is spliced at the current segment, that is, for example, the current segment does not belong to the same signal as a signal carried in the preceding segment of data stream 14. For example, in case of media signals, a data stream may be spliced to insert an ad in between segments of the media data stream, resulting in a data stream, the verification chain of which is interrupted at the splicing point. In general, splicing may refer to a composition of data stream segments, which are not rendered checkable on trustworthiness jointly.

In other words, an embodiment of the invention is an apparatus 20 for decoding a data stream 14, the data stream comprising a temporal sequence of segments 17 (e.g., coded video sequences, CVSs) (E.g., the segments form a temporal sequence with respect to a presentation order or presentation time assigned to the segments of the temporal sequence), wherein the apparatus is configured for: deriving 21, from the data stream, for a segment 17* of the sequence of segments, whether a verification chain (or a signed subsequence of the temporal sequence) within the temporal sequence of segments is interrupted at the segment; and if the data stream indicates that the verification chain is interrupted, and if the data stream comprises a digital signature 43 for checking the segment on trustworthiness (e.g., a digital signature 43 for checking the segment, or a portion thereof, on trustworthiness) (e.g., the apparatus is configured for checking whether the data stream comprises a digital signature 43 for the segment; e.g., if the data stream does not comprise a digital signature for the segment, the apparatus does not check the segment on trustworthiness), deriving 21, from the data stream, the digital signature 43, which is for being checked against a verification string 48, which is independent of a preceding segment, which directly precedes the segment 17* in the temporal sequence.

According to an embodiment, the apparatus is configured for verifying the segment by checking whether the verification string 48 fits to (or matches) the digital signature 43 (e.g., in order to check the data stream, or the predetermined portion 13 thereof, on trustworthiness).

According to an embodiment, the apparatus is configured for providing (or forwarding) a predetermined portion 13 of the segments and the digital signature 43 for a verification of the segment (e.g., performed by a further apparatus or entity) (E.g., the verification comprises checking whether the predetermined portion 13 of the data stream fits to (or matches) the digital signature 43).

In other words, an embodiment of the invention is an apparatus 20 for decoding a data stream 14, wherein the apparatus is configured for checking the data stream on trustworthiness (e.g., apparatus for verifying a data stream), the data stream comprising a temporal sequence of segments (e.g., coded video sequences, CVSs) (E.g., the segments form a temporal sequence with respect to a presentation order or presentation time assigned to the segments of the temporal sequence), wherein the apparatus is configured for deriving 21, from the data stream, whether a verification chain (or a signed subsequence of the temporal sequence) within the temporal sequence of segments is interrupted at the segment; and if the data stream indicates that the verification chain is interrupted, and if the data stream comprises a digital signature 43 for the segment (e.g., a digital signature 43 for checking the segment, or a portion thereof, on trustworthiness) (e.g., the apparatus is configured for checking whether the data stream comprises a digital signature for the segment; e.g., if the data stream does not comprise a digital signature for the segment, the apparatus does not check the segment on trustworthiness) deriving 21 the digital signature 43 from the data stream; forming 39 a verification string 48 independent of a preceding segment, which directly precedes the segment in the temporal sequence; and checking 63 whether the verification string 48 fits to the digital signature 43.

Further optional details of embodiments will be described in the following.

According to an embodiment, apparatus 20 may check whether the data stream 14 comprises a digital signature for the current segment. For example if not, the current segment will not be checked on trustworthiness. In other words, there may be cases in which the current segment, which is inserted into the verification chain, thereby causing the interruption of the verification chain, is not verifiable, i.e., does not include a digital signature. In these cases, the trustworthiness check may be omitted.

According to an embodiment, data stream 14 comprises an indication which indicates, for the current segment, whether the verification chain is interrupted at the current segment. For example, the indication may be a syntax element, such as a flag, e.g., DSCI_splicing_flag described below. For example, the indication may be included in the above-mentioned verification parameter set.

In FIG. 7, the current segment is indicated using a reference sign 17*. The temporal sequence of data stream 14 in FIG. 7 includes, for illustrative purpose, segments 17 and segments 17*. Segments 17 belong to a verification chain, e.g., a signed subsequence of the temporal sequence. Segment 17* is inserted between two the segments 17 thereby causing an interruption of the verification chain at the current segment 17*.

According to an embodiment, apparatus 20 may check whether the segments 17* is checkable on trustworthiness, and if it is not checkable on trustworthiness, apparatus 20 may assume that the verification chain is interrupted at the segment 17*.

In the trustworthiness check 41, as illustrated in FIG. 7, in block 39, the verification string 48 is formed based on the predetermined portion 13. For example, block 39 may include blocks 31 and 49 of FIG. 2. Block 63 of the trustworthiness check 41 as illustrated in FIG. 7 checks whether the verification string 48 fits to the digital signature 43. For example, block 63 may include blocks 59 and the comparison between the check value 47 and the verification string 48 of FIG. 2.

According to an embodiment, the forming of the verification string 48 depends on whether or not apparatus 20 detected an interruption of the verification chain at segment 17*. If the verification chain is interrupted (i.e., apparatus 20 detected an interruption), and if the data stream 14 comprises a digital signature for the segment 17*, verification string 48 is formed by using a previous hash value, which is obtained by subjecting a portion of the preceding segment to a hash function 31. If apparatus 20 detected an interruption, and if the data stream 14 comprises a digital signature for the segment 17*, the verification string 48 is formed independent of any of the segments 17, which precede a segment 17* in the temporal sequence.

According to an embodiment, the forming of the verification string 48 may further depend on whether or not the segment 17* is the first segment of a further verification chain. If the segment 17* is the first segment of a further verification chain, verification string 48 is formed independent of any of the segments, which precede the segment 17* in the temporal sequence. In examples, if the segment is not the first segment of a further verification chain, the verification string 48 may be formed using a previous hash value, the further previous hash value being obtained by subjecting a portion of a further preceding segment of the temporal sequence to the hash function. For example, the further preceding segment is a segment belonging to the further verification chain. In other words, the sequence of temporal sequence of data stream 14 may include multiple verification chains, which may be interleaved. Apparatus 20 may check at the splicing point, i.e., the point at which apparatus 20 detected an interruption of a verification chain, i.e., for segment 17*, whether the segment 17* is the first segment of a further verification chain, so that temporal consistency of segment 17* with its preceding segment of the further verification chain may be checked untrustworthiness.

In more general terms, apparatus 20 may check whether the segment 17* is the first segment of a further verification chain. For example, this check may be performed using indication 61 described with respect to FIG. 5. Thus, the second aspect may be combined with a first aspect of the invention.

Alternatively, apparatus 20 may determine whether or not the segment 17* is the first segment of the further verification chain based on verification information signaled in data stream 14 for the segment 17*. In other words, apparatus 20 may derive from data stream 14, verification information for the segments 17* and compare the verification information to preceding verification for an even further preceding segment or for the further preceding segment of the temporal sequence. For example, the verification information may be information of the above-mentioned verification parameter set, for example, the DSCI SEI message, or a portion of the information signal therein. If the verification information matches the preceding verification information, apparatus may infer that the segment 17* is not the first segment of the further verification chain, and otherwise, i.e., if the verification information does not match, e.g., is not identical to the preceding verification information, apparatus 20 may infer that the segment 17* is not the first segment of the further verification chain.

For example, matching between the verification information and the preceding verification information may mean that they are identical, or that an evaluation of the verification information yields that the verification information and the preceding verification information are part of the same content or verification chain, e.g., that they are subsequent segments of the same verification chain. For example, a content identifier of the verification information may change from segment to segment and may allow checking, whether the segments are subsequent segments of the same content. For example, when determining whether the segment 17* is the first segment of a further verification chain, apparatus 20 may compare the verification information of the segment 17* to verification information for a plurality of preceding segments of the temporal sequence, e.g., all segments, or all except for the directly preceding one.

For example, the verification information may comprise one or more of an indication of a certificate comprising the public key for decrypting the digital signature 43, an indication of the hash function, and an identifier of a content of the segment, an identifier, which associates the segment to a media asset.

According to an embodiment, if the data stream 14 indicates that the verification chain is interrupted at segment 17*, apparatus 20 may store the hash value of the preceding segment for a verification of a subsequent segment of segment 17*. In other words, apparatus 20 may store the hash value obtained by subjecting a portion of the preceding segment to a hash function to use this hash value in a later verification of a subsequent segment, which belongs to the verification chain, which is interrupted at segment 17*. In other words, apparatus 20 may continue the verification chain at the subsequent segment of the verification chain.

Figure 8:
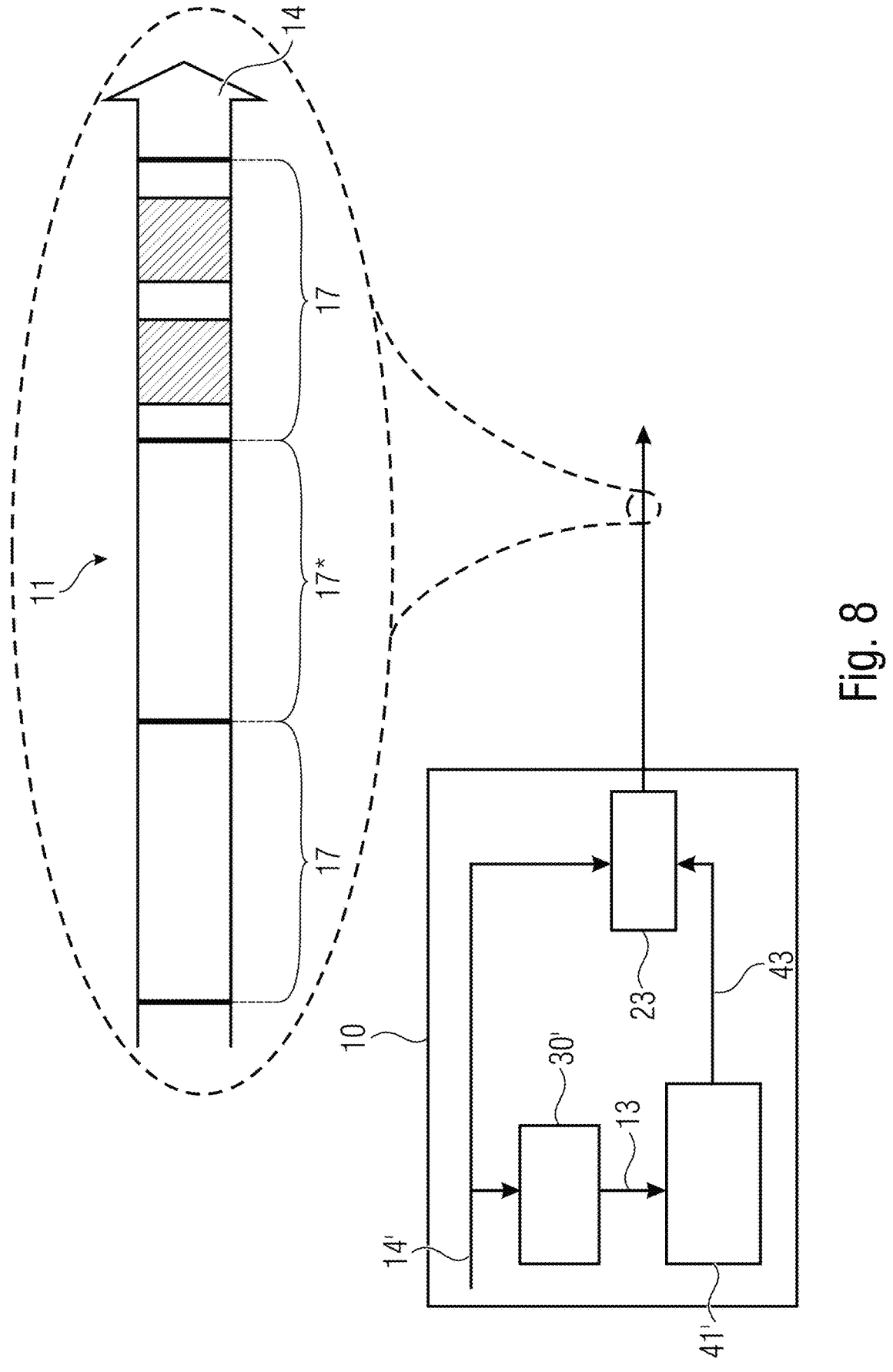
FIG. 8 illustrates an apparatus for encoding a data stream according to the second aspect.

FIG. 8 illustrates an apparatus 10 for encoding a data stream according to an embodiment of the second aspect of the invention. Apparatus 10 of FIG. 8 may be an embodiment of apparatus 10 of FIG. 3. Apparatus 10 of FIG. 8 may provide the data stream 14 as described in the context of apparatus 20 of FIG. 7. Apparatus 10 according to FIG. 8 is configured for rendering the data stream 14 checkable on trustworthiness. Apparatus 10 inserts into data stream 14, a temporal sequence of segments 17, e.g., comprising segments 17, 17*. If a verification chain within the temporal sequence of segments is interrupted at a segment 17* of the temporal sequence of segments, and if the segment 17* is to rendered checkable on trustworthiness, apparatus 20 renders segment 17* checkable on trustworthiness by forming a verification string 48 independent of a preceding segment, which directly precedes the segment 17* in the temporal sequence. Apparatus 10 obtains a digital signature 43 based on the verification string 48 and inserts the digital signature 43 into the data stream 14.

Although the description of FIGS. 1 to 8 relates to apparatuses, the block diagrams of these figures may alternatively be considered as flow diagrams of respective methods, in which each of the blocks represents a step of the respective method. Thus, FIGS. 1 to 8 further provide illustrations of the respective methods.

In the following, aspects of the invention are described again, in other words, in specific implementations and further embodiments of the invention will be described. The embodiments described with respect to FIGS. 1 to 8 may be considered generalizations of the embodiments described in the following, however, the following description may further contain additional embodiments of the invention, which may be implemented independent of the previously described embodiments. Any of the features and details described with respect to the following embodiments, may optionally be integrated into the previous embodiments.

Although the following description refers to video data streams, it is clear that the same concepts may equivalently be applied to any types of media data streams, or any types of data streams comprising sampled data. Further examples of sampled data may be waveform signals. Besides audio signals, further example of waveform signals are biomedical waveform signals.

Authenticating video needs providing information to a client about how the hashing has been carried out (which includes the hashing method used and how the data is organized and what is actually hashed and how) the certificate that carries the public key which can be used to verify the and providing the one or more signature for the video.

In the following, an existing solution for content verification is described. The subsequent embodiments of the invention may be described in terms of amendments to this existing solution, so that details of this existing solution may form features of embodiments of the invention.

For this purpose, an existing solution is to include 3 SEI messages within each Coding Video Sequence (CVS) of the video bitstream:

1. Digitally signed content initialization SEI message: It carries information about which is the hashed method that is used, an URL to get a certificate or a C2PA manifest that contains among other information the public key and UUID for the content that is used when computing the signature so that different bitstreams (e.g., different audio and video streams) that belong to the same content and are separately signed can be identified as belonging to the same content (thus the audio of a different content cannot be used for a particular video—avoiding that what a person said at a different time is used for a new video) and how many substreams are used to produce signatures. The later refers to splitting the content into different substreams, each of which has a signature and thus if less important parts of the video are dropped (e.g., for layered coding a high resolutions enhancement layer when there is network congestion) the received parts can still be authenticated.

2. Digitally signed content selection SEI message: It identifies the substream ID to which the slices (i.e. VCL NAL units) of a picture belong to.

3. Digitally signed content verification SEI message: It provides for each substream the corresponding signature.

An existing solution of these three SEI messages and of the verification process is reproduced in the following. Details of this solution may optionally be implemented in embodiments of the present invention, unless stated otherwise, e.g. in terms of amendments of this solution.

| Digitally signed content initialization SEI message: | |
|---|---|
| | Descriptor |
| trustworthy_content_initialization( payloadSize ) { | |
| dsci_hash_method_type | u(8) |
| dsci_key_source_uri | st(v) |
| dsci_num_verification_substreams_minus1 | ue(v) |
| dsci_key_retrieval_mode_idc | ue(v) |
| if( dsci_key_retrieval_mode_idc == 1){ | |
| dsci_use_key_register_idx_flag | u(1) |
| if( dsci_use_key_register_idx_flag ) | |
| dsci_key_register_idx | ue(v) |
| } | |
| dsci_content_uuid_present_flag | u(1) |
| if( dsci_content_uuid_present_flag) | |
| dsci_content_uuid | u(128) |
| } | | dsci_hash_method_type indicates the secure hash algorithm that is used to calculate message digests for subsets of SPS, PPS, APS, PH and VCL NAL units of the coded video sequence. Based on these message digests and the digital signatures present in digitally signed content verification SEI messages, a decoder can verify that the coded video was produced by the content originator indicated by the syntax elements dsci_key_source_uri, dsci_use_key_register_idx_flag and, if dsci_use_key_register_idx_flag flag is equal to 1, dsci_key_register_idx. The supported values for the syntax element dsci_hash_method_type, the block size used for calculating the message digest, and the size of the calculated message digests are specified in. Values of dsci_hash_method_type that are not listed in the Table 1 are reserved for future use by ITU-T|ISO/IEC and shall not be present in payload data conforming to this version of this Specification. Decoders shall ignore trustworthy initialization SEI messages that contain reserved values for dsci_hash_method_type. The secure hash algorithms listed in Table 1 are specified in the "Secure Hash Standard" FIPS PUB 180-4.

TABLE 1

| Supported values of dsci_hash_method_type | | | |
|---|---|---|---|
| dsci_hash_method_type | Hash method | Block size (bits) | Message digest size (bits) |
| 0 | SHA-1 | 512 | 160 |
| 1 | SHA-224 | 512 | 224 |
| 2 | SHA-256 | 512 | 256 |
| 3 | SHA-384 | 1024 | 384 |
| 4 | SHA-512 | 1024 | 512 |
| 5 | SHA-512/224 | 1024 | 224 |
| 6 | SHA-512/256 | 1024 | 256 | dsci_key_source_uri contains a URI with syntax and semantics as specified in IETF Internet Standard 66. If dsci_key_retrieval_mode_idc is equal to 0, dsci_key_source_uri specifies a C2PA Manifest Store as specified in C2PA Technical Specification. If dsci_key_retrieval_mode_idc is equal to 1, the following applies:

If dsci_use_key_register_idx_flag is equal to 0, the URI
identifies the certificate of the content provider that can
be used for verifying the signatures present in follow-
ing digitally signed content verification SEI messages;
Otherwise (if dsci_use_key_register_idx_flag is equal to
1), the URI identifies a register of certificates and the
certificate of the content provider that can be used for
verifying the signatures present in following digitally
signed content verification SEI messages as indicated
by dsci_key_register_idx.

dsci_num_verification_substreams_minus1 plus 1 indi-
cates the number of substreams for which message digests
are calculated and signatures may be present in following
digitally signed content verification SEI messages.

The variable NumVerificationSubstream is derived as:

NumVerificationSubstream=dsci_num_verification_
substreams_minus1+1. dsci_key_retrieval_mode_idc
equal to 0 indicates that the URI contained in dsci_
key_source_uri specifies a C2PA Manifest Store as
specified in C2PA Technical Specification. dsci_
key_retrieval_mode_idc equal to 1 indicates that the
URI contained in dsci_key_source_uri and, when pres-
ent, dsci_key_register_idx specify a certificate. In this
version of this Specification dsci_key_retrieval_mod-
e_idc shall be in the range of 0 to 1. Decoders shall also
allow other values of dsci_key_retrieval_mode_idc,
but shall ignore the content of the digitally signed
content initialization SEI message, associated digitally
signed content selection SEI messages and associated
digitally signed content verification SEI messages.

dsci_use_key_register_idx_flag equal to 1 indicates that
the URI contained in dsci_key_source_uri specifies a reg-
ister of certificates and the syntax element dsci_key_regis-
ter_idx is present in the SEI message. dsci_use_key_regis-
ter_idx_flag equal to 0 indicates that the URI contained in
dsci_key_source_uri specifies a certificate and the syntax
element dsci_key_register_idx is not present in the SEI
message.

When dsci_key_retrieval_mode_idc is equal to 0, the
media asset for which Active Manifest, as specified in C2PA
Technical Specification, provides content binding is the
digitally signed content initialization SEI message. The
following constraints apply to the C2PA Manifest Store
identified by the dsci_key_source_uri:

The Active Manifest shall contain exactly one
c2pa.hash.data, as specified in C2PA Technical Speci-
fication, hard binding to content assertion.

The exclusion range indicated in the c2pa.hash.data shall
match the dsci_key_source_uri bytes in the digitally
signed content initialization SEI message.

dsci_key_register_idx, when present, contains an index
that specifies the certificate of the content provider, in the
certificate register indicated by dsci_key_source_uri, which
can be used for verifying the signatures present in following
digitally signed content verification SEI messages.

The certificate indicated by the syntax elements dsci_
key_retrieval_mode_idc, dsci_use_key_register_idx_flag,
dsci_key_source_uri, and, if dsci_use_key_register_
idx_flag is equal to 1, dsci_key_register_idx shall specify a
digital signature method, with associated parameters (if
applicable), and the public key of the content provider.
When dsci_key_retrieval_mode_idc is equal to 1, the format
in which this information is provided is outside the scope of
this specification. It is suggested that a digital signature
algorithm conforming to the "Digital Signature Standard"
FIPS 186-5 is used.

dsci_content_uuid_present_flag equal to 1 specifies that
the syntax element dsci_content_uuid is present. dsci_con-
tent_uuid_present_flag equal to 0 specifies that the syntax
element dsci_content_uuid is not present. When dsci_
key_retrieval_mode_idc is equal to 0, dsci_conten-
t_uuid_present_flag shall be equal to 1.

dsci_content_uuid, when present, indicates an identifier
for the video content and shall have a value specified as a
UUID according to the procedures of ISO/IEC 11578:1996,
Annex A.

When a digitally signed content initialization SEI mes-
sage is present in an AU, the calculation of NumVerifica-
tionSubstream message digests is initialized according to the
specification in FIPS PUB 180-4 for the specified dsci_
hash_method_type. Each SPS, PPS, APS, PH and VCL NAL
unit following the digitally signed content initialization SEI
message is associated to one of the NumVerificationSub-
stream message digests; the verification substream id is
either indicated by the digitally signed content selection SEI
message or, if no digitally signed content selection SEI
message is present for a PU, inferred to be equal to 0. The
message used for calculating the k-th message digest, with
k being in the range from 0 to dsci_num_verification_sub-
streams_minus1, inclusive, is obtained by concatenating all
SPS, PPS, APS and VCL NAL units associated with the k-th
verification substream. The calculation of the message
digests is conducted based on blocks, where the block size
is specified in Table 1 depending on the value of dsci_
hash_method_type. For each SPS, PPS, APS, PH and VCL
NAL unit, the associated message digest is updated accord-
ing to the algorithm specified in FIPS PUB 180-4 for the
specified dsci_hash_method_type. Note that, since the mes-
sage digests are calculated for the concatenation of all SPS,
PPS, APS, PH and VCL NAL units for a verification
substream, some of the processing blocks typically span
over two or more successive NAL units.

| Digitally signed content selection SEI message: | |
| --- | --- |
| | Descriptor |
| trustworthy_content_selection( payloadSize ) { | |
|    dscs_verification_substream_id | u(8) |
| } | | dscs_verification_substream_id indicates the verification
substream to which the SPS, PPS, APS, PH and VCL NAL
units of the current coded picture are assigned to. When a
digitally signed content initialization SEI message was pres-
ent in the current coded video sequence, but no digitally
signed content selection SEI message is present for a coded
picture, the value of dscs_verification_substream_id is
inferred to be equal to 0. The value of dscs_
verification_substream_id shall be in the range from 0 to
dsci_num_verification_substreams_minus1, inclusive.

As specified below, the message digest for the verification
substream with id equal to dscs_verification_substream_id
is updated with the SPS, PPS, APS, PH and VCL NAL units
of the current coded picture according to the dsci_
hash_method_type specified in the preceding digitally
signed content initialization SEI message.

Digitally signed content verification SEI message:

| | Descriptor |
|---|---|
| trustworthy_content_verification( payloadSize ) { | |
|     dscv_verification_substream_id | u(8) |
|     dscv_signature_length_in_octets_minus1 | u(16) |
|     dscv_signature | u(v) |
| } | | dscv_verification_substream_id indicates the verification substream to which the SEI message applies.

dscv_signature_length_in_octets_minus1 plus 1 specifies the length of the syntax element dscv_signature in octets (one octet consists of 8 bits).

dscv_signature contains the digital signature for the verification substream indicated by dscv_verification_substream_id.

The verification of the bitstream signature consists of the following ordered steps:

1. The calculation of the message digest referred to as CurrDigest is finalized as follows:

The concatenation of the SPS, PPS, APS, PH and VCL NAL units for the verification substream with id equal to dscv_verification_substream_id is padded according to the specification in FIPS PUB 180-4. Note that it is sufficient to pad the last NAL unit of the verification substream.

The calculation of the message digest CurrDigest is finalized according to the specification in FIPS PUB 180-4. The length (in bits) of the message digest is given in Table 1.

2. The reference message digest RefDigest is determined as follows:

If dscv_verification_substream_id is greater than 0, the reference message digest RefDigest is the last calculated message digest for the verification substream with id equal to dscv_verification_substream_id−1. It is a requirement of bitstream conformance that any digitally signed content verification SEI associated with verification substream id equal to dscv_verification_substream_id−1 is present before the digitally signed content verification SEI message with verification substream id equal to dscv_verification_substream_id.

Otherwise, if the current digitally signed content verification SEI message is the first digitally signed content verification SEI with verification id equal to 0 in the coded video sequence and the preceding coded video sequence did not contain any digitally signed content initialization SEI message (this includes the case that the current coded video sequence is the first coded video sequence in the bitstream), the RefDigest is set equal to a bitstring that consists of DigestSize bits equal to 1, where DigestSize is the size of the message digest as specified in Table 1.

Otherwise, the reference message digest RefDigest is the last calculated message digest for the verification substream with id equal to 0.

3. The identification string IdString is constructed by concatenating the binary representations of the reference message digest RefDigest, the current message digest, and the dsci_hash_method_type and, when present, the dsci_content_uuid2.

The number of bits for RefDigest is determined by the value of dsci_hash_method_type which was valid when calculating the value of RefDigest, the number of bits for CurrDigest is determined by the current value of dsci_hash_method_type, and the value of dsci_hash_method_type is represented with 8 bits and, when present, the value of dsci_content_uuid is represented with 128 bits.

4. The identification string IdString represents the message used for verifying the signature. The signature verification algorithm and the public key used for verifying the signature are indicated by the syntax elements dsci_use_key_register_idx_flag, dsci_key_source_uri, and, if dsci_use_key_register_idx_flag is equal to 1, dsci_key_register_idx.

NOTE 1—Since the bitstring used for signature verification includes the RefDigest, it cannot only be verified that the SPS, PPS, APS, PH and VCL NAL units used for calculated the current message digest are correct, but it can additionally be verified that neither additional SPS, PPS, APS, PH and VCL NAL units were added to the bitstream nor SPS, PPS, APS, PH and VCL NAL units were removed from the bitstream.

NOTE 2—When a decoder tunes into a bitstream, the IdString constructed for the first digitally signed content verification SEI message cannot be verified, because the value of RefDigest cannot be calculated correctly. But starting from the second digitally signed content verification SEI message, the signatures can be verified.

After verification, the message digest for the verification substream with id equal to dscv_verification_substream_id is reinitialized according to the specification in FIPS PUB 180-4 for the specified dsci_hash_method_type.

In the following, further embodiments of the first aspect of the invention are described.

The currently defined SEI messages allow to signal signatures for substreams in segments and allow to verify temporal consistency by signing over the hashes of consecutive segments.

However so far there exists no signalling for the start or the end point of the signed bitstream (section). Especially the missing end signalling would allow to shorten (or cut) the bitstream at the end without being noticed by a decoder. Explicit signalling of the starting point allows to indicate special treatment to the decoder, e.g. for combining the hash of the previous segment into the signature. Explicit signalling of the starting point also allows to concatenate bistreams that were independently encoded and signed using the same signing key (e.g. two segments of a news cast). Unless a EOB NAL unit would be used, the decoder would not be able to recognize, that the second bitstream is allowed to break the link, and may incorrectly indicate a verification problem.

Solution 1:

Signal a flag to indicate the end of the signed bitstream section.

Signalling Variant a)

A flag is added to the digitally signed content initialization SEI message as follows:

| | Descriptor |
|---|---|
| digitally_signed_content_initialization( payloadSize ) { | |
|     dsci_hash_method_type | u(8) |
|     dsci_key_source_uri | st(v) |
|     dsci_last_signed_segment_flag | u(1) |
|     dsci_num_verification_substreams_minus1 | ue(v) |

-continued

| | Descriptor |
|---|---|
| dsci_key_retrieval_mode_idc | ue(v) |
| if( dsci_key_retrieval_mode_idc == 1){ | |
|    dsci_use_key_register_idx_flag | u(1) |
|    if( dsci_use_key_register_idx_flag ) | |
|       dsci_key_register_idx | ue(v) |
| } | |
| dsci_content_uuid_present_flag | u(1) |
| if( dsci_content_uuid_present_flag) | |
|    dsci_content_uuid | u(128) |
| } | |

This is the advantageous signalling, because only one initialization SEI is signalled for all substreams the information is available to the decoder already at the beginning of the signed segment since the hash method type is already included into the signature, no additional data dependency between initialization SEI and signing is introduced Signalling Variant b)

Alternatively, a flag is added to the digitally signed content verification SEI message as follows:

| | Descriptor |
|---|---|
| digitally_signed_content_verification( payloadSize ) { | |
|    dscv_verification_substream_id | u(8) |
|    dsci_last_signed_segment_flag | u(1) |
|    dscv_signature_length_in_octets_minus1 | u(16) |
|    dscv_signature | u(v) |
| } | |

Figures 9A, 9B, 10:
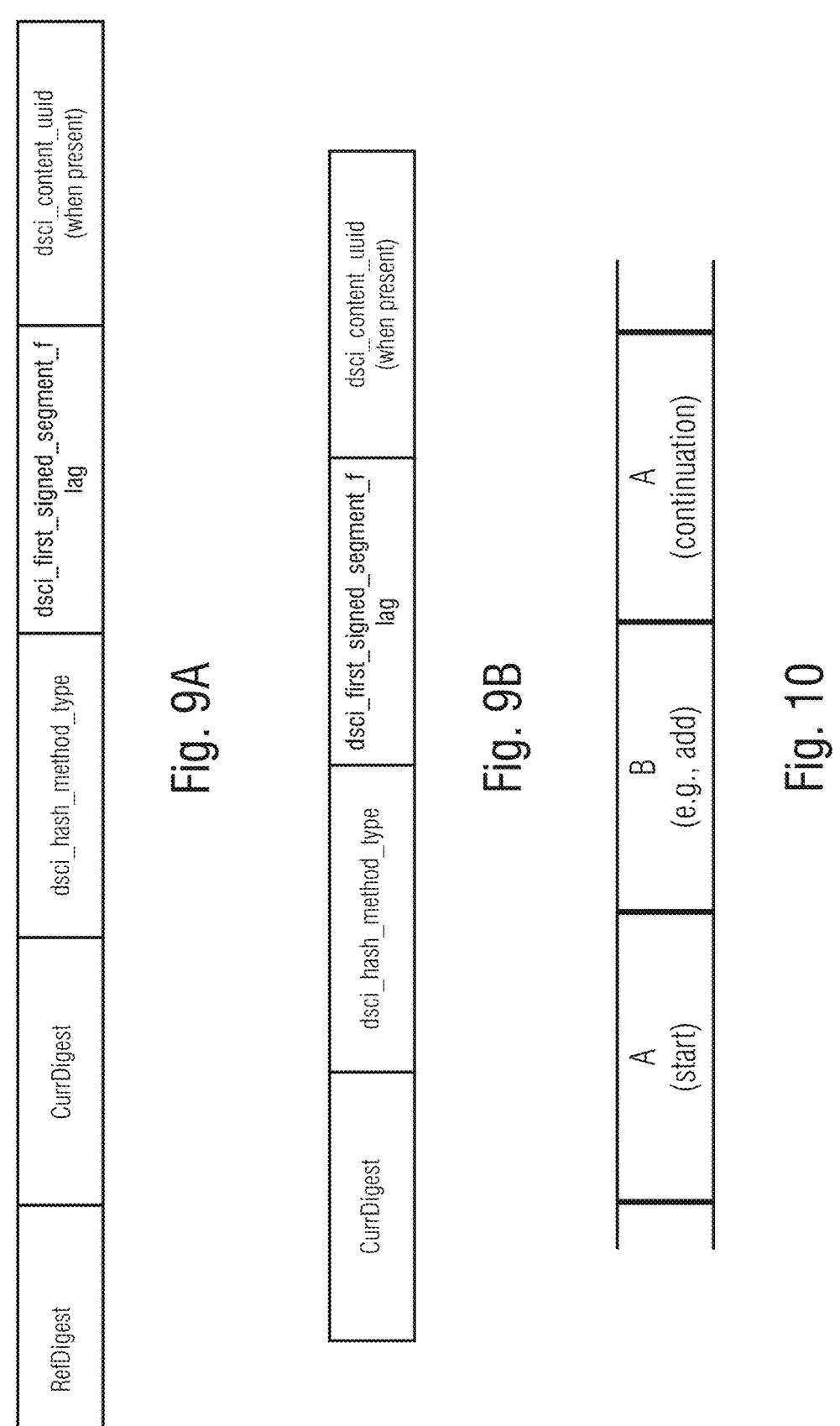
FIGS. 9A, B illustrate verification strings according to embodiments of the first aspect.
FIG. 10 illustrates a sequence of segments of a data stream according to an embodiment of the second aspect.

For Both Signalling Variants:

To make sure, a malicious user cannot modify the indication of the last signed bitstream segment, the value of the flag is added into the signature, e.g. the input data for the signature would be composed out of the elements shown in FIG. 9A.

Solution 2:

Signal a flag to indicate the beginning of the signed bitstream section.

Signalling Variant a)

A flag is added to the digitally signed content initialization SEI message as follows:

| | Descriptor |
|---|---|
| digitally_signed_content_initialization( payloadSize ) { | |
|    dsci_hash_method_type | u(8) |
|    dsci_key_source_uri | st(v) |
|    dsci_first_signed_segment_flag | u(1) |
|    dsci_num_verification_substreams_minus1 | ue(v) |
|    dsci_key_retrieval_mode_idc | ue(v) |
|    if( dsci_key_retrieval_mode_idc == 1){ | |
|       dsci_use_key_register_idx_flag | u(1) |
|       if( dsci_use_key_register_idx_flag ) | |
|          dsci_key_register_idx | ue(v) |
|    } | |
|    dsci_content_uuid_present_flag | u(1) |
|    if( dsci_content_uuid_present_flag) | |
|       dsci_content_uuid | u(128) |
| } | |

This is the advantageous signalling, because only one initialization SEI is signalled for all substreams the information is available to the decoder already at the beginning of the signed segment since the hash method type is already included into the signature, no additional data dependency between initialization SEI and signing is introduced Signalling Variant b)

Alternatively, a flag is added to the digitally signed content verification SEI message as follows:

| | Descriptor |
|---|---|
| digitally_signed_content_verification( payloadSize ) { | |
|    dscv_verification_substream_id | u(8) |
|    dsci_first_signed_segment_flag | u(1) |
|    dscv_signature_length_in_octets_minus1 | u(16) |
|    dscv_signature | u(v) |
| } | |

For Both Signalling Variants:

To make sure, a malicious user cannot modify the indication of the last signed bitstream segment, the value of the flag is added into the signature, e.g. the input data for the signature would be composed out of the elements shown in FIG. 9A.

If a signed bitstream segment is the first, no temporal reference to the previous segment is used. In this case the refDigest should:

a) not be included into the signature at all, as shown in FIG. 9B,

Or b) set to 0x00 for all bytes of the hash (length dependent on the used hash type)

Conditional Signalling in Digitally Signed Content Verification SEI

Since temporal dependent signatures are only used in the base substream 0, the flags indicating beginning and end of the signed bitstream section are only relevant in this substream.

If one or both flags are signalled in digitally signed content verification SEI, they should only be present, if the SEI message applies to substream 0.

| | Descriptor |
|---|---|
| digitally_signed_content_verification( payloadSize ) { | |
|    dscv_verification_substream_id | u(8) |
|    if (dscv_verification_substream_id == 0) { | |
|       dsci_first_signed_segment_flag | u(1) |
|       dsci_last_signed_segment_flag | u(1) |
|    } | |
|    dscv_signature_length_in_octets_minus1 | u(16) |
|    dscv_signature | u(v) |
| } | |

This saves signalling bits by avoiding redundancies and possible conflicts.

In the following, further embodiments of the second aspect of the invention will be described.

A further extension is described in the following. The solution presented above allows for splicing of complete authenticated sections in a manner that the content can be verified. In typical scenarios, splicing occurs as a result of unexpected events such as ad insertion, where some content is introduced within the middle of a video bitstream (i.e., a section). Such a spliced content might or might not be authenticated. An illustration of such a splicing case is shown in FIG. 10.

A problem arises with the depicted use-case, since A (start could be correctly verified). B, if verified would not be correctly verified if the last segment of A was taken into account. If B was not verified, there would not be any problem in principle. But when coming back to A (continuation) either A (continuation) would be either not verified against A (start), i.e. one could remove something, or A (continuation) would be verified with the last segment of B and that would be erroneous.

In a further embodiment, a solution is provided in which, splicing is signaled (e.g., with a flag called dsci_splicing_flag), so that the decoder verifying an authenticated bitstream can identify such splicing points. It could also be used for a part of the bitstream that is not authenticated but as indication that some content has been spliced together, for the receiver to interpret that in case the content previous to the splicing point did not finalized, that it probably will continue at some point when the spliced content finishes (e.g., after B is finished). At an splicing point, where the following content is authenticated (e.g. A continuation) if the content was new and not just a continuation a previous content (e.g., it has a certificated from a new content provider or it has a new UUID or somehow an indication was added that it starts with a new segment—e.g. dsci_first_signed_segment_flag), it would be treated as if random access was performed and that segment was the first segment. Otherwise, the if the content was not new and it was a continuation of a previously decoded content (A continuation) temporal consistency with the last segment of the same content received some time before should be checked. For that purpose, the hash value of the last segment before content B is spliced needs to be used. In the example before, the first segment of A (continuation) would be checked with the last segment of A (start).

Therefore, the splicing indication in the bitstream would provide information to a decoder verifying more than one video sequence that the segment directly following the splicing point and the segment preceding the splicing point are not to be verified together. Under some circumstances, if the segment following the splicing points is to be verified (i.e., contains authentication information), it might be that it is to be verified with a previous segment transmitted some times before. Thus, the decoder needs to identify whether at a splicing point:

a) the following segment of the new content is authenticated
    a. if it is not, whether the previous segment that was authenticated might be needed in the future for verification of a further segment 2b. if it is, whether it is the first segment of the content or not.
  b) When the following segment of the new content is to be authenticated and it is not the first segment of the new content where the previous segment of the same content is to be found.

An option to derive the previously described information can be done with the single flag dsci_splicing_flag as follows. When an authenticated content is being received and at some point an splicing flag is found, the decoder would interpret that the content may follow at some point in the future and it stores the digest message of the last segment for the lowest substream (which is the one that is used for temporal consistency). Note that this could happen at B in the example if such a splicing flag was indicated if B was authenticated or even if it was not. As a further option if B is not authenticated, the fact of B being not authenticated could be interpreted directly as that splicing has happened.

After a while, when a further splicing flag is encountered, the decoder determines whether the content is the first segment of a new content or not the first segment of a content that was sent before. For instance, the decoder compares the digitally signed content SEI message and compares it to a previously received digitally signed content SEI message. If the digitally signed content initialization SEI message is exactly the same as a previously received digitally signed content initialization SEI message (i.e., it points to the same certificate, has the same UUID value, same hash_method_type), the decoder can determine that the following segment is not the first segment of a new content and thus verifies that segment with a previously stored digest message (last one) for which such an SEI message applied and verifies it with that last segment. This digitally signed content initialization SEI message comparison could be done in different ways:

1) Exact match as described
  2) Exact match but only when the UUID is present
  3) Coherence check: it allows some values to change
    a. as for instance, hash_method_type
    b. The UUID might change but the generation of it follows a particular rule
      i. It is the previous UUID+1
      ii. It is computed based on a time information and the used previous time and current time do not have a gap A further option would be to provide some more signaling to ease the determination of whether a digest message needs to be stored or not and whether a segment needs to be verified with a previously (not directly preceding segment). For instance, if indication of the last segment of a content is provided in the bitstream, if at a splicing point the last segment flag is not indicated the digest message needs to be stored. Analogously, if at an splicing point the first segment flag is not indicated in the following segment a previously stored digest message is searched for and is jointly verified. If the last flag is indicated the digest message is not stored and if the first message is indicated the segment is not jointly verified with any previous segment.

An instantiation of such a syntax is shown in the following within the digitally signed content initialization SEI message:

| | Descriptor |
|---|---|
| digitally_signed_content_initialization( payloadSize ) { | |
| dsci_hash_method_type | u(8) |
| dsci_key_source_uri | st(v) |
| dsci_splicing_flag | u(1) |
| dsci_num_verification_substreams_minus1 | ue(v) |
| dsci_key_retrieval_mode_idc | ue(v) |
| if( dsci_key_retrieval_mode_idc == 1){ | |
| dsci_use_key_register_idx_flag | u(1) |
| if( dsci_use_key_register_idx_flag ) | |
| dsci_key_register_idx | ue(v) |
| } | |
| dsci_content_uuid_present_flag | u(1) |
| if( dsci_content_uuid_present_flag) | |
| dsci_content_uuid | u(128) |
| } | |

However, the splicing information could be provided at a separate SEI message.

Video Coding Schemes

In the following, a video coding scheme will be described, into which embodiments of the invention may optionally be implemented. In other words, apparatus 20 according to any of the previously described embodiments may be a video decoder, which is implemented according to any of the embodiments of decoder 20 described in the following. Similarly, apparatus 10 may optionally be a video encoder according to any of the embodiments of encoder 10 that will be described in the following.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIG. 11, FIG. 12, and FIG. 13. Thereinafter the description of embodiments of the concept of the present invention is presented along with a description as to how such concepts could be built into the encoder and decoder of FIG. 11, and FIG. 12, respectively, although the embodiments described with the subsequent Figures and following, may also be used to form encoders and decoders not operating according to the coding framework underlying the encoder and decoder of FIG. 11, and FIG. 12, and FIG. 13.

Figure 11:
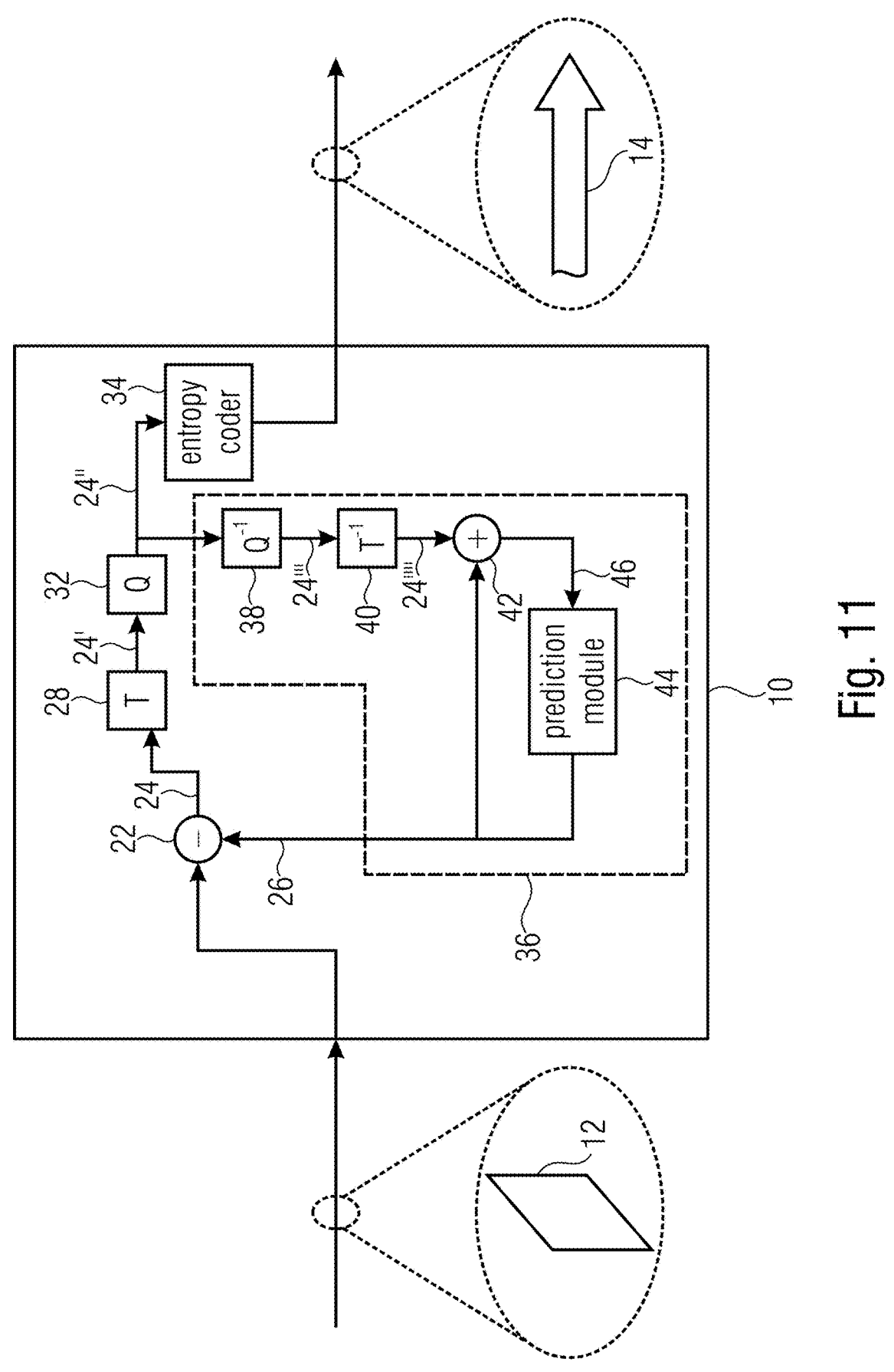
FIG. 11 illustrates a video encoder according to an embodiment.
Figure 12:
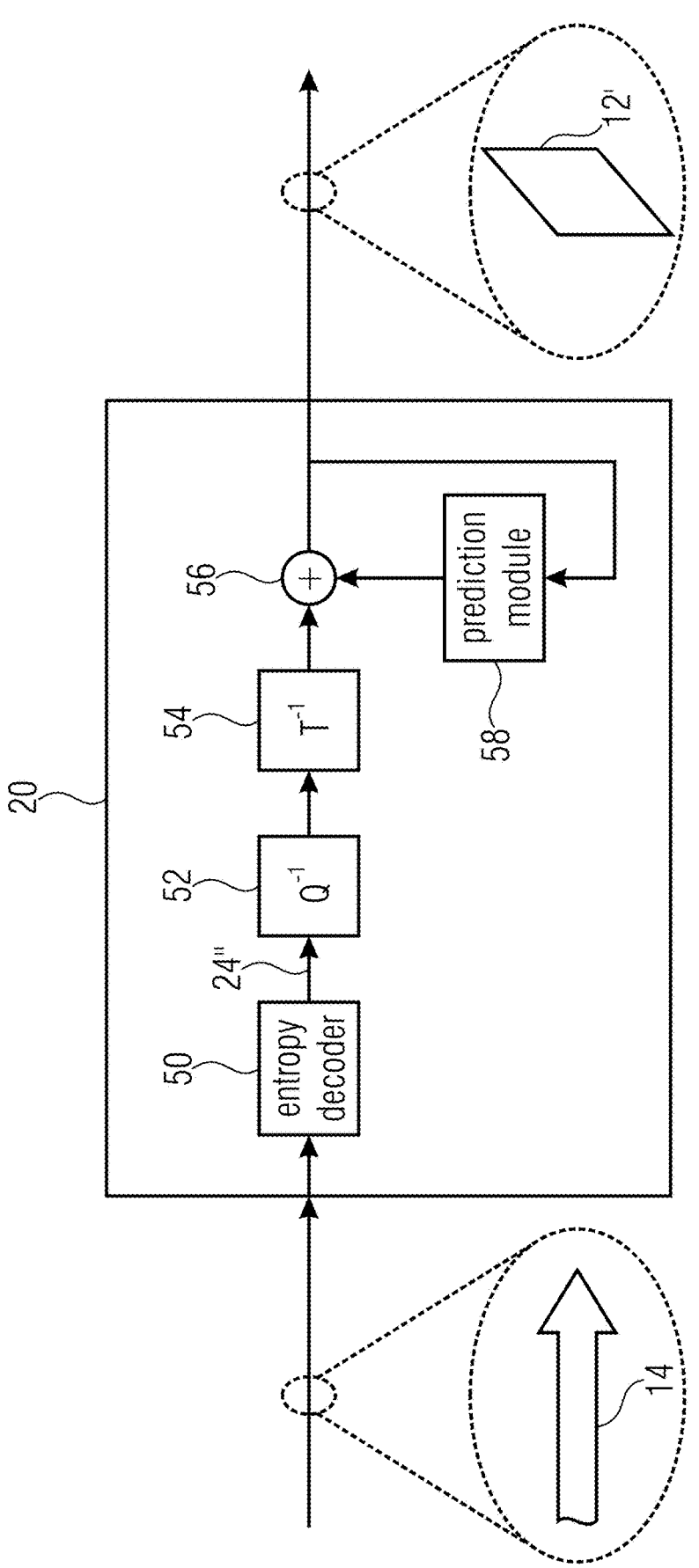
FIG. 12 illustrates a video decoder according to an embodiment.

FIG. 11 shows an apparatus for predictively coding a picture 12 into a data stream 14 exemplarily using transform-based residual coding. The apparatus, or encoder, is indicated using reference sign 10. FIG. 12 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 11 and FIG. 12 exemplarily use transform based prediction residual coding, although embodiments of the present application are not restricted to this kind of prediction residual coding. This is true for other details described with respect to FIG. 11, and FIG. 12, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24'' is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24'' encoded into, and decodable from, data stream 14. To this end, the prediction stage 36 may internally, as is shown in FIG. 11, comprise a dequantizer 38 which dequantizes prediction residual signal 24'' so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24''', which corresponds to the original prediction residual signal 24 except for quantization loss. A combiner 42 of the prediction stage 36 then recombines, such as by addition, the prediction signal 26 and the prediction residual signal 24''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 12, may be internally composed of components corresponding to, and interconnected in a manner corresponding to, prediction stage 36. In particular, entropy decoder 50 of decoder 20 may entropy decode the quantized spectral-domain prediction residual signal 24'' from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24'' so that, as shown in FIG. 12, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24″, data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12′, respectively, into the segments. The decoder 20 uses these parameters to subdivide the picture in the same manner as the encoder did, to assign the same prediction modes to the segments, and to perform the same prediction to result in the same prediction signal.

Figure 13:
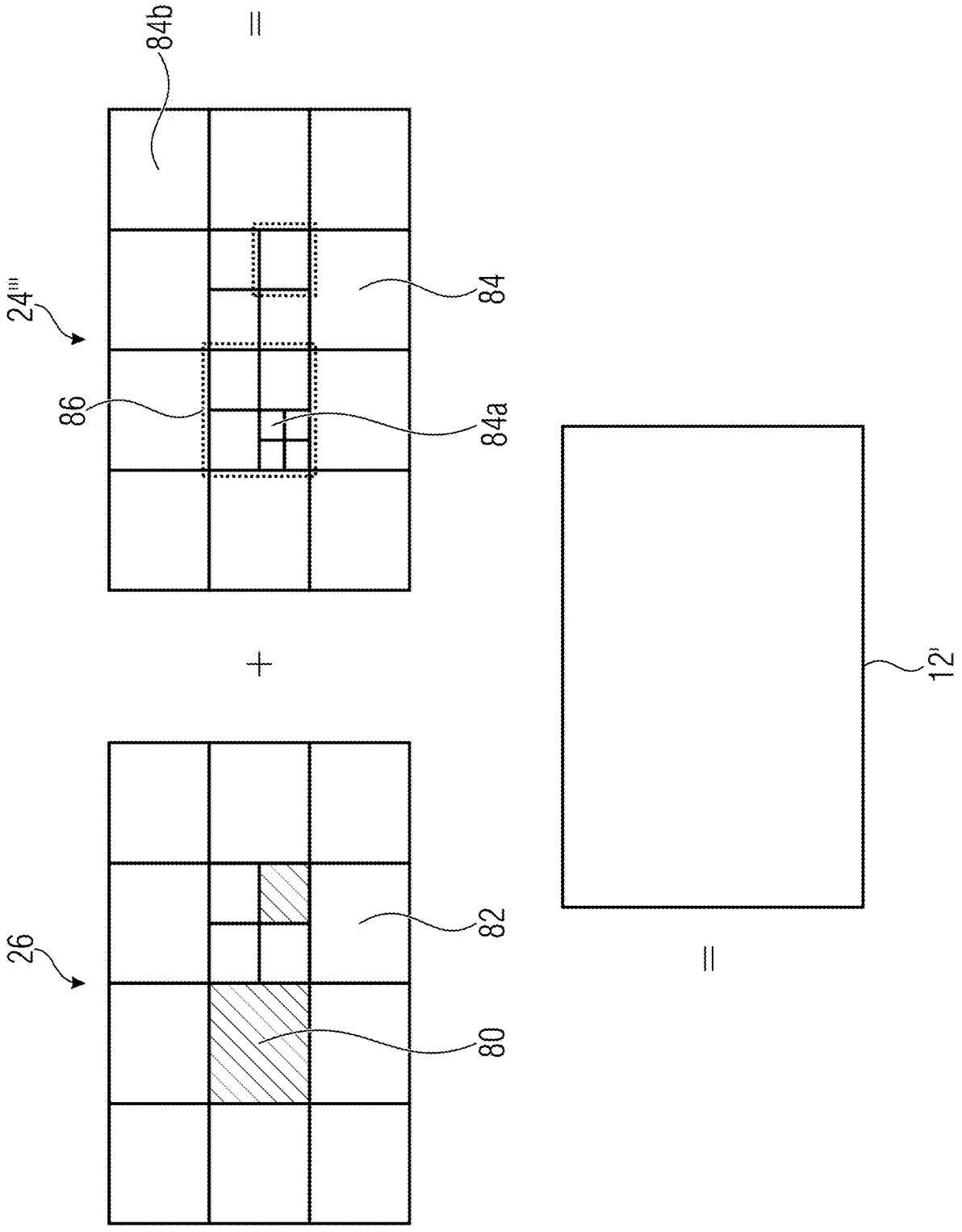
FIG. 13 illustrates subdivisions of a picture according to an embodiment.

FIG. 13 illustrates the relationship between the reconstructed signal, i.e. the reconstructed picture 12′, on the one hand, and the combination of the prediction residual signal 24″ as signaled in the data stream 14, and the prediction signal 26, on the other hand. As already denoted above, the combination may be an addition. The prediction signal 26 is illustrated in FIG. 13 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 13 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24″ in FIG. 13 is also illustrated as a subdivision of the picture area into blocks 84. These blocks might be called transform blocks in order to distinguish same from the coding blocks 80 and 82. In effect, FIG. 13 illustrates that encoder 10 and decoder 20 may use two different subdivisions of picture 12 and picture 12′, respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 13 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 13 further illustrates that the combination of the prediction signal 26 and the prediction residual signal 24″″ directly results in the reconstructed signal 12′. However, it should be noted that more than one prediction signal 26 may be combined with the prediction residual signal 24″″ to result into picture 12′ in accordance with alternative embodiments.

In FIG. 13, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform

DST-IV, where DST stands for Discrete Sine Transform

DCT-IV

DST-VII

Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)

Inverse DST-IV

Inverse DCT-IV

Inverse DST-VII

Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform.

As already outlined above, FIG. 11, FIG. 12 and FIG. 13 have been presented as an example where the inventive concept described further below may be implemented in order to form specific examples for encoders and decoders according to the present application. Insofar, the encoder and decoder of FIG. 11, and FIG. 12, respectively, may represent possible implementations of the encoders and decoders described herein below. FIG. 11, and FIG. 12 are, however, only examples. An encoder according to embodiments of the present application may, however, perform block-based encoding of a picture 12 using the concept outlined in more detail below and being different from the encoder of FIG. 11 such as, for instance, in that same is no video encoder, but a still picture encoder, in that same does not support inter-prediction, or in that the sub-division into blocks 80 is performed in a manner different than exemplified in FIG. 13. Likewise, decoders according to embodiments of the present application may perform block-based decoding of picture 12' from data stream 14 using the coding concept further outlined below, but may differ, for instance, from the decoder 20 of FIG. 12 in that same is no video decoder, but a still picture decoder, in that same does not support intra-prediction, or in that same sub-divides picture 12' into blocks in a manner different than described with respect to FIG. 13 and/or in that same does not derive the prediction residual from the data stream 14 in transform domain, but in spatial domain, for instance.

Embodiments provide an H.264/AVC decoder, an H.264/AVC video data stream, a video encoder for providing an H.264/AVC video data stream, or an H.265/HEVC decoder, an H.265/HEVC video data stream, a video encoder for providing an H.265/HVC video data stream, or an H.266/VVC decoder, an H.266/VVC video data stream, a video encoder for providing an H.266/VVC video data stream.

In the following, embodiments of the invention are described, which may optionally be implemented in, or combined with, the framework described above. with respect to FIG. 11 to FIG. 13.

All embodiments of the invention of the present disclosure may optionally be implemented in combination with any of the four video coding variants described in the following. That is, the data stream 14 may be a data stream according to any of these variants, apparatus 20 may be configured for decoding a video from data stream 14 according to any of the three variants, and apparatus 14 may be configured for providing the data stream in accordance to any of the four variants. The first and the second variants may optimally be combined with each other.

According to the first one of the two variants of the invention the video is decoded from the video data stream by block-based predictive and transform based residual decoding by decoding prediction residual data of a residual block into/from the video data stream.

According to the first variant, the decoding of the prediction residual data of the residual block is performed by use of context-adaptive variable length decoding by using a first syntax element indicating a total number of non-zero transform coefficients in a transform block representing the residual block, and a trailing-one number, indicating a number of non-zero transform coefficients having an absolute value of one when traversing the coefficients along a scan order, one or more second syntax elements indicating a sign of the non-zero transform coefficients having an absolute value of one when traversing the coefficients along the scan order, one or more third syntax elements indicating a value of the non-zero transform coefficients except for the number of non-zero transform coefficients having an absolute value of one when traversing the coefficients along the scan order, a fourth syntax element indicating a total number of zero-valued transform coefficient levels in the transform block from a firstly-encountered non-zero transform coefficient in the scan order onwards, and one or more fifth syntax elements indicting positions of the non-zero transform coefficients along the scan order by indicating a number of consecutive zero-valued transform coefficients in the scan order between in the scan order consecutively encountered non-zero transform coefficients, or, in alternative to the use of context-adaptive variable length decoding, the decoding of the prediction residual data of the residual block is performed by use of context-adaptive binary arithmetic decoding by decoding a significance map which indicates positions of non-zero transform coefficients in a transform block representing the residual block by, in a forward scan traversing transform coefficients of the transform block, decoding a significance flag which indicates whether a non-zero transform coefficient is positioned at a current position, and, if so, and if the current position is not the last in the forward scan, decoding a last-significance flag which indicates whether the non-zero transform coefficient positioned at the current position is the last non-zero transform coefficient in the forward scan order, and decoding the non-zero transform coefficients' values sequentially in a reverse scan order, reversing the forward scan order.

According to the first one of the two variants of the invention the video is encoded into the video data stream by block-based predictive and transform based residual encoding by encoding prediction residual data of a residual block into the video data stream.

According to the first variant, the encoding of the prediction residual data of the residual block is performed by use of context-adaptive variable length encoding by using a first syntax element indicating a total number of non-zero transform coefficients in a transform block representing the residual block, and a trailing-one number, indicating a number of non-zero transform coefficients having an absolute value of one when traversing the coefficients along a scan order, one or more second syntax elements indicating a sign of the non-zero transform coefficients having an absolute value of one when traversing the coefficients along the scan order, one or more third syntax elements indicating a value of the non-zero transform coefficients except for the number of non-zero transform coefficients having an absolute value of one when traversing the coefficients along the scan order, a fourth syntax element indicating a total number of zero-valued transform coefficient levels in the transform block from a firstly-encountered non-zero transform coefficient in the scan order onwards, and one or more fifth syntax elements indicting positions of the non-zero transform coefficients along the scan order by indicating a number of consecutive zero-valued transform coefficients in the scan order between in the scan order consecutively encountered non-zero transform coefficients, or in alternative to the use of context-adaptive variable length encoding, the encoding of the prediction residual data of the residual block is performed by use of context-adaptive binary arithmetic encoding by encoding a significance map which indicates positions of non-zero transform coefficients in a transform block representing the residual block by, in a forward scan traversing transform coefficients of the transform block, encoding a significance flag which indicates whether a non-zero transform coefficient is positioned at a current position, and, if so, and if the current position is not the last in the forward scan, encoding a last-significance flag which indicates whether the non-zero transform coefficient positioned at the current position is the last non-zero transform coefficient in the forward scan order, and encoding the non-zero transform coefficients' values sequentially in a reverse scan order, reversing the forward scan order.

According to the second variant, a video decoder (or apparatus for decoding a video from a video data stream) comprises a coded picture buffer (CPB) and a decoded picture buffer (DPB). The video decoder is configured to receive a data stream having pictures of a video encoded thereinto along a coding order as a sequence of access units (AU) (e.g., the term "access unit" refers to a portion of the video data stream, which comprises the coded video data, or information, relating to one time frame of the video), decode a current AU removed from the CPB using inter-picture prediction from a referenced reference picture stored in the DPB to acquire a decoded picture, and insert the decoded picture into the DPB, assign to each reference picture stored in the DPB a classification as one of a short-term reference picture, a long-term reference picture and an unused-for-reference picture, read DPB mode information from the current AU, if the DPB mode information indicates a first mode, remove one or more reference pictures classified as a short-term picture, according to a first-in-first-out (FIFO) strategy, from the DPB, if the DPB mode information indicates a second mode, read memory management control information comprising at least one command in the current AU and execute the at least one command so as to change the classification assigned to at least one of the reference pictures stored in the DPB, and use the classification of the reference pictures in the DPB, for managing reference picture removal from the DPB.

According to the second variant, a video data stream is ought to be decoded by being fed to a decoder comprising a coded picture buffer (CPB). According to the second variant, a video encoder (or apparatus for encoding a video into a video data stream) is configured to encode, into a data stream, pictures of a video encoded in a coding order as a sequence of access units (AU), wherein the apparatus is configured to, in encoding the AUs, encode a current picture using inter-picture prediction from a referenced reference picture stored in a decoded picture buffer (DPB) into a current AU, and insert a decoded version of the current picture in the DPB into the DPB, assign to each reference picture stored in the DPB a classification as one of a short-term reference picture, a long-term reference picture and an unused-for-reference picture, write DPB mode information into the current AU, if the DPB mode information indicates a first mode, remove one or more reference pictures classified as a short-term picture, according to a FIFO strategy, from the DPB, if the DPB mode information indicates a second mode, write memory management control information comprising at least one command into the current AU, the command being instructive to change the classification assigned to at least one of the reference pictures stored in the DPB, wherein the classification of the reference pictures in the DPB, is used for managing reference picture removal from the DPB.

According to the third variant, the video is decoded from the video data stream by block-based predictive decoding and transform-based residual decoding by decoding prediction residual data of a residual block from the video data stream by use of context-adaptive binary arithmetic decoding of quantization indices of transform coefficients of a transform block representing the residual block and sequential dequantization of the quantization indices according to which a value of a current transform coefficient depends on a parity of quantization indices of previous quantization indices.

According to the third variant, the video is encoded into the video data stream by block based predictive encoding and transform based residual encoding by encoding the prediction residual data of a residual block into the video data stream by use of context-adaptive binary arithmetic coding of quantization indices of transform coefficients of a transform block representing the residual block and sequential quantization of the transform coefficients to obtain the quantization indices, according to which a quantizer for quantizing a current transform coefficient depends on a parity of quantization indices of previous quantization indices.

All three variants relate to a video encoder, a video decoder, a method for decoding a video, a method for encoding a video, and a video data stream as obtained by the respective encoding method.

In the following, further optional details and features of the first and second variants are described.

Embodiments of the first variant and the second variant may be compliant to H.264/AVC. Embodiments of the third variant may be compliant to H.266/VVC.

One aspect of the first and second variants relates to the handling of decoded pictures and their buffering in a decoded picture buffer, DPB.

According to an embodiment, two types of reference pictures may be distinguished: short-term and long-term. The encoder does the same in emulating the DPB fill state of the decoder at each point in time during decoding. A reference picture may be marked as "unused for reference" when it becomes no longer needed for prediction reference. The conversion among these three statuses (short-term, long-term, and unused for reference) is controlled by a decoded reference picture marking process. There are two alternative decoded reference picture marking mechanisms, the implicit sliding window process and the explicit memory management control operation (MMCO) process. For each currently decoded picture or each currently decoded AU, it is signalled in the data stream as to which process shall be used for DPB management. The sliding window process marks a short-term reference picture as "unused for reference" when the number of reference frames is equal to a given maximum number (max-num-ref-frames in SPS). The short-term reference pictures are stored in a first-in, first-out manner so that the most recently decoded short-term pictures are kept in the DPB. The explicit MMCO process is controlled via multiple MMCO commands. If this mode is selected for a current AU or currently decoded picture, the bitstream contains for this, or in this, AU one or more of these commands. An MMCO command may any of 1) mark one or more short-term or long-term reference picture as "unused for reference," 2) mark all the pictures as "unused for reference," or 3) mark the current reference picture or an existing short-term reference picture as long-term, and assign a long-term picture index to that long-term picture.

The reference picture marking operations as well as any output—for sake of presentation—and removal of pictures from the DPB may be performed after a picture has been decoded.

Some possible but optional details of the reference picture marking mechanism are discussed in the following. 1) A first aspect relates to gaps in frame number and non-Existing pictures. Although not explained above, it might be that each reference picture in the DPB is associated with a frame number. Normally this number increases by one for each reference picture, but gaps in frame number may be allowed by setting a corresponding high level (such as sequence level) flag, which might be called parameter-gaps-in-frame-num-allowed-flag, to one for example in order to allow that an encoder or a MANE (media aware network element) can deliver a bitstream in which the frame numbers increase by more than one for a reference picture relative to the preceding reference picture in decoding order. This might be favourable in order to support temporal scalability. A sequence of AUs with gaps in the frame numbers may be received, and non-existing pictures to fill the gap may be created. The non-existing pictures are assigned with frame number values in the gap and are considered as reference pictures during decoded reference picture marking, but will not be used for output (hence not displayed). The non-existing pictures ensure that the status of the DPB, with respect to the frame numbers of the pictures residing in it, is the same for a decoder that received the pictures as for a decoder that did not receive the pictures.

Another possible aspect of the first and second variants relates to the loss of a reference picture when using sliding Window. When a reference picture is lost, it may be possible to conceal the picture and to possibly report the loss to the encoder if a feedback channel is available given that the loss is detected. If gaps in frame number are disallowed, a discontinuity in the frame number values indicates an unintentional loss of a reference picture. If gaps in frame number are allowed, a discontinuity in frame number values may be caused by either intentional removal of temporal layers or subsequences or an accidental picture loss, and decoders should infer a picture loss only if a non-existing picture is referred in the inter prediction process. The picture order count of a concealed picture may not be known which can cause the decoder to use incorrect reference pictures without detecting any errors when decoding B-pictures.

An even further possible aspect of the first and second variants relates to the loss of a reference picture with MMCO. When losing a reference picture that contains an MMCO command marking a short-term reference picture as "unused for reference," then the status of reference pictures in the DPB becomes incorrect and consequently, reference picture lists for a few pictures following the lost picture may become incorrect. If a picture containing MMCO commands related to long-term reference pictures is lost there is a risk that the number of long-term reference pictures in the DPB is different from what it would have been if the picture was received, resulting in an "incorrect" sliding window process for all the following pictures. That is, the encoder and decoder may contain a different number of short-term reference pictures resulting in out-of-sync behaviour of the sliding window process. What makes the situation even worse is that a decoder will not necessarily know that the sliding window process is out-of-sync.

In the following, MMCO commands are shown. One or more or all of the commands may apply to yield in different embodiments:

| memory_management_control_operation | Memory Management Control Operation |
|---|---|
| 0 | End memory_management_control_operation syntax element loop |
| 1 | Mark a short-term reference picture as "unused for reference" |
| 2 | Mark a long-term reference picture as "unused for reference" |
| 3 | Mark a short-term reference picture as "used for long-term reference" and assign a long-term frame index to it |
| 4 | Specify the maximum long-term frame index and mark all long-term reference pictures having long-term frame indices greater than the maximum value as "unused for reference" |
| 5 | Mark all reference pictures as "unused for reference" and set the MaxLongTermFrameIdx variable to "no long-term frame indices" |
| 6 | Mark the current picture as "used for long-term reference" and assign a long-term frame index to it |

A further option for the implementation of decoder and encoder according to the first and second variants is described now, may optionally be combined with the one concerning the DPB management described before, and relates to entropy decoding of some syntax element such as the residual data in form of transform coefficients into the bitstream. Lossless entropy coding of lossy quantized transform coefficients is a crucial part of an efficient video codec. One such method is referred to as context-adaptive-variable-length-coding (CAVLC) in which the encoder switches between different variable length code (VLC) tables for various syntax elements, depending on the values of the previously transmitted syntax elements in the same slice in a context-adaptive fashion. Encoder and decoder may use the CAVLC. Due to the fact that each syntax element is coded into the bitstream by writing a corresponding codeword into the bitstream which has been selected for that syntax element from the context-adaptively selected code table, each CAVLC encoded bit in the bitstream can be associated to a single syntax element. The relevant information about the transform coefficient levels in scan order to be present in bitstream is, thus, available in a direct accessible form as syntax elements when CAVLC is used. Encoder and decoder may use CAVLC to signal the transform coefficients in the bitstream. The following syntax elements may be used, e.g. syntax elements having the following semantics:

One syntax element indicating the total number of non-zero transform coefficient levels in a transform block (as indicated by CoeffToken)

One or more syntax elements indicating the number of trailing one transform coefficient levels (as indicated by CoeffToken), e.g. a run of syntax elements occurring at the end of scanning the syntax elements in a scan order up to the last non-zero syntax element which are all one, and their sign (as indicated by trailing_ones_sign_flag)

One or more syntax element per non-zero transform coefficient except the trailing one transform coefficients, which indicates the transform coefficient level value One syntax element indicating the total number of zero-valued transform coefficient levels Syntax elements indicting the number of consecutive transform coefficient levels in scan order with zero value from a current scan position onwards before a non-zero valued transform coefficient level is encountered.

It might alternatively or additionally be that the encoder might select between the usage of CABAC, thus context-adaptive binary arithmetic coding, and CAVLC and signal the selection in the bitstream and that the decoder reads this signal and uses the indicated way of decoding the residual data.

A further option for the implementation of decoder and encoder according to the first and second variants is described now, may optionally be combined with any of the one concerning the DPB management and the one concerning CAVLC described before, and relates to a quarter pel interpolation filter. In order to allow inter-prediction at a finer granularity than the regular full-pel sample grid, a sample interpolation process is used to derive sample values at sub-pel sample positions which can range from half-pel positions to quarter-pel position. One method to carry out quarter-pel interpolation may be used by encoder and decoder and is as follows. First, a 6-tap FIR filter is used to generate sample values at half-pel positions followed by an averaging of the generated half-pel position sample values through interpolation to generate sample values at quarter-pel position for luma components.

Further embodiments according to the first and second variants are described in the following:

According to an embodiment, the apparatus may further comprise a decoded picture buffer (DPB) and be configured to decode a current AU using inter-picture prediction from a referenced reference picture stored in the DPB to obtain a decoded picture, and insert the decoded picture into the DPB, assign to each reference picture stored in the DPB a classification as one of a short-term reference picture, a long-term reference picture and an unused-for-reference picture, read DPB mode information from the current AU, if the DPB mode information indicates a first mode, remove one or more reference pictures classified as a short-term picture, according to a FIFO strategy, from the DPB, if the DPB mode information indicates a second mode, read memory management control information comprising at least one command in the current AU and execute the at least one command so as to change the classification assigned to at least one of the reference pictures stored in the DPB, and use the classification of the reference pictures in the DPB, for managing reference picture removal from the DPB.

In an embodiment, the apparatus may be configured to read from the current AU an indication whether the decoded picture is not used for inter-picture prediction; perform the insertion of the decoded picture into the DPB, if the decoded picture is not indicated to be not used for inter-picture prediction or not directly to be output, and directly output the decoded picture without buffering same in the DPB, if the decoded picture is indicated to be not used for inter-picture prediction and directly to be output.

According to an embodiment, the apparatus may be configured to assign a frame index to each reference picture in the DPB, classified to be a long-term picture, and use a predetermined reference picture in the DPB, classified to be a long-term picture, as the referenced reference picture in the DPB if the frame index assigned to the predetermined reference picture is referred to in the current AU.

In an embodiment, the apparatus may be configured to one or more of: if the at least one command in the current AU is a first command, re-classify a reference picture in the DPB, classified to be a short-term reference picture, as an unused-for-reference picture, if the at least one command in the current AU is a second command, re-classify a reference picture in the DPB, classified to be a long-term reference picture, as an unused-for-reference picture, if the at least one command in the current AU is a third command, re-classify a reference picture in the DPB, classified to be a short-term picture, as a long-term reference picture, and assign a frame index to the re-classified reference picture, if the at least one command in the current AU is a fourth command, set an upper frame index limit according to the fourth command, and re-classify all reference picture in the DPB, classified to be a long-term picture, and having assigned thereto a frame index exceeding the upper frame index limit, as an unused-for-reference picture, if the at least one command in the current AU is a sixth command, classify the current picture as a long-term picture, as an unused-for-reference picture, and assign a frame index to the re-classified reference picture.

According to an embodiment, the apparatus may be configured to remove any reference picture from the DPB, which is classified as an unused-for-reference picture, and which is no longer to be output.

In an embodiment the apparatus may be configured to read an entropy coding mode indicator from the data stream, and decode prediction residual data from the current AU using a context adaptive variable length coding mode if the entropy coding mode indicator indicates the context adaptive variable length coding mode, and using a context adaptive binary arithmetic coding mode if the entropy coding mode indicator indicates the context adaptive binary arithmetic coding mode.

According to an embodiment, the apparatus may be configured to derive quarter pel values in the referenced reference picture based on a motion vector in the current AU and using 6-tap FIR filter so as to derive half-pel values and averaging neighboring half-pel values.

In an embodiment, the apparatus may be configured to:
  decode a current AU using inter-picture prediction from a referenced reference picture stored in the DPB to acquire a decoded picture, and to insert the decoded picture into the DPB,
  assign to each reference picture stored in the DPB a classification as one of a short-term reference picture, a long-term reference picture and an unused-for-reference picture,
  read DPB mode information from the current AU,
  if the DPB mode information indicates a first mode, remove one or more reference pictures classified as a short-term picture, according to a first-in-first-out (FIFO) strategy, from the DPB,
  if the DPB mode information indicates a second mode, read memory management control information comprising at least one command in the current AU and execute the at least one command so as to change the classification assigned to at least one of the reference pictures stored in the DPB, and use the classification of the reference pictures in the DPB, for managing reference picture removal from the DPB.

According to an embodiment, the apparatus may be configured to:
  read from the current AU an indication whether the decoded picture is not used for inter-picture prediction;
  perform the insertion of the decoded picture into the DPB, if the decoded picture is not indicated to be not used for inter-picture prediction or not directly to be output, and directly output the decoded picture without buffering same in the DPB, if the decoded picture is indicated to be not used for inter-picture prediction and directly to be output.

In an embodiment, the apparatus may be configured to:

assign a frame index to each reference picture in the DPB, classified to be a long-term picture, and use a predetermined reference picture in the DPB, classified to be a long-term picture, as the referenced reference picture in the DPB if the frame index assigned to the predetermined reference picture is referred to in the current AU.

According to an embodiment, the apparatus may be configured to one or more of:

if the at least one command in the current AU is a first command, re-classify a reference picture in the DPB, classified to be a short-term reference picture, as an unused-for-reference picture, if the at least one command in the current AU is a second command, re-classify a reference picture in the DPB, classified to be a long-term reference picture, as an unused-for-reference picture, if the at least one command in the current AU is a third command, re-classify a reference picture in the DPB, classified to be a short-term picture, as a long-term reference picture, and assign a frame index to the re-classified reference picture, if the at least one command in the current AU is a fourth command, set an upper frame index limit according to the fourth command, and re-classify all reference picture in the DPB, classified to be a long-term picture, and having assigned thereto a frame index exceeding the upper frame index limit, as an unused-for-reference picture, if the at least one command in the current AU is a sixth command, classify the current picture as a long-term picture, as an unused-for-reference picture, and assign a frame index to the re-classified reference picture.

In an embodiment, the apparatus may be configured to:

remove any reference picture from the DPB, which is classified as an unused-for-reference picture, and which is no longer to be output.

In the following, further optional details and features of the third variant are described.

Multiple Reference Lines (MRL): For intra prediction, not only the adjacent line of neighboring samples can be used but also one of the two non-adjacent reference lines as the reference line for intra-picture prediction of luma samples, corresponding to the two or three lines away from the current block.

Adaptive MV Resolution (AMVR): A selection of the MV resolution at the CU level is performed. For inter predicted CUs, the selected MV resolution is indicated and can be one quarter, one half, whole integer, or four, in units of luma samples. If half luma sample resolution is selected, an alternative luma interpolation filter is used for the half-sample position in this block, i.e. different interpolation filter are used when the resolution is quarter-per or half-pel for the MV.

History-Based MV Prediction (HMVP): In addition to spatial and temporal neighbor MV predictions, a new candidate type is added for MV prediction in the merge mode and AMVP candidate list. The HMVP candidates are established using a five-entry table that is maintained and updated using a first-in-first-out (FIFO) rule. The motion vector candidates list are generated by using the spatial and temporal neighbors and HMVP candidates.

Affine Motion: An affine motion model with CU-level signaling is used for luma. The CU-level affine motion can be either a 4-parameter model or a 6-parameter model. The 4-parameter model uses two MVs, which correspond to two control points located at the top-left and top-right corners of the CU and the 6-parameter model uses three MVs, which corresponds to three control points located at the top-left, bottom-left and top-right corners. When a CU is coded in affine motion mode, the luma block of the CU is spilt into 4×4 subblocks and the MV at the central sample position of each subblock is calculated according to the affine motion model and set as the subblock MV based on the control points. The subblock MV is rounded to $\frac{1}{16}$ luma sample precision during the calculation and a set of 6-tap interpolation filters is applied to generate the prediction of each sub-bloc. As for the case of non-affine, a merge mode and AMVP mode are used for prediction and coding of affine motion parameters.

Coefficient coding: When encoding the coefficient level, first a flag (SigFlag) is indicated, that specifies that whether coefficient level is not 0. When the flag is equal to 1 (the coefficient level is not 0) a further flag is indicated (Gt1-Flag), which indicates whether the absolute level is greater than 1, in which case (absolute level is greater than 1) two further flags are present, a parity level flag (Parity-Flag) that specifies the parity of the transform coefficient level and a further flag (Gt3-Flag) that specifies whether the absolute value of the transform coefficient level is greater than a 3.

Video decoding according to the fourth, is performed by decoding a video from the video data stream by block-based predictive and transform based residual decoding by decoding prediction residual data of an intra predicted block from the video data stream by use of context-adaptive binary arithmetic decoding by decoding a coordinate of a position in a transform block representing the prediction residual data at which position a last non-zero transform coefficient is encountered when traversing transform coefficients of the transform block along a predetermined scan order, and sequentially decoding values of transform coefficients including and ranked, along the predetermined scan order, between the last non-zero transform coefficient and a firstly scanned transform coefficient, and selecting the predetermined scan order among a diagonal scan order, a horizontal scan order, and a vertical scan order depending on an intra prediction mode of the intra predicted block by use of a mapping which maps each of a plurality of intra prediction modes onto a corresponding one of the diagonal scan order, the horizontal scan order, and the vertical scan order.

Video encoding according to the fourth variant, to which the invention relates, is performed by encoding a video into the video data stream by block-based predictive and transform based residual encoding by encoding prediction residual data of an intra predicted block into the video data stream by use of context-adaptive binary arithmetic coding by encoding a coordinate of a position in a transform block representing the prediction residual data at which a last non-zero transform coefficient is encountered when traversing transform coefficients of the transform block along a predetermined scan order, and sequentially encoding values of transform coefficients including and ranked, along the predetermined scan order, between the last non-zero transform coefficient and a firstly scanned transform coefficient, and selecting the predetermined scan order among a diagonal scan order, a horizontal scan order, and a vertical scan order depending on an intra prediction mode of the intra predicted block by use of a mapping which maps each of a plurality of intra prediction modes onto a corresponding one of the diagonal scan order, the horizontal scan order, and the vertical scan order.

The invention includes a video encoder, a video decoder and a method for decoding a video according to the above-described video decoding variant, and a method for encoding a video, and a video data stream as obtained by the respective encoding method according to the above-described video fourth variant.

In the following, further optional details and features of the specific video encoding and video decoding variant of embodiments of the invention are described.

Embodiments of the fourth variant may be compliant to H.265/HEVC.

PCM

The prediction, transform, quantization and entropy coding are bypassed, and the samples are directly represented by a pre-defined number of bits. When PCM is enabled the number of bits (minus1) used for representing the luma and chroma samples is indicated respectively. Besides, the minimum block sizes and maximum block sizes (as a difference to the minimum) for 2N×2N blocks for which PCM can best used are indicated. When a 2N×2N block is being parsed, if the sizes of that block are in between the described minimum and maximum values a flag indicates whether the PCM mode is used or not. When the PCM mode is used the PCM samples are byte aligned and luma samples of the block are directly represented/parsed in raster scan with the indicated PCM luma bit length and afterwards the chroma samples of the PCM block are represented/parsed in raster scan with the indicated PCM chroma bit length, being the first half of the chroma samples Cb and the remaining Cr samples. Furthermore, the CABAC decoding engine is terminated every time PCM flag is parsed and initialized after the decoding PCM syntax Intra Mode Dep. Coeff. Scan Order.

The scan order of the coefficients in an intra coded block is dynamically changed based on the transform block sizes and intra modes. The scanning is carried out for each 4×4 subblocks/regions of the transform block (e.g., using only one coefficient region for the 4×4 transform block size, 4 coefficient regions for 8×8 transform blocks, 16 regions for 16×16 transform block size). The selection of the scanning method for intra modes is dependent on the transform block sizes. For transform block sizes of 16×16 and 32×32 the scanning is performed diagonally (starting at $0,0\rightarrow1,0\rightarrow0,$ $1\rightarrow2,0\rightarrow1,1\rightarrow0,2\rightarrow3,0$ and so on—e.g. decreasing the y value and increasing the x value with step 1 at each step and when y equals 0 restarting with y having a value of x+1 and setting x to 0 while starting at value 0,0). For transform block sizes of 4×4 (luma or chroma) and 8×8 (luma) the coefficient scanning order depends on the intra mode associated with a intra direction of the prediction of neighboring blocks. The vertical scan is used when the prediction direction is close to horizontal and the horizontal scan is used when the prediction direction is close to vertical. For other prediction directions, the diagonal up-right scan is used.

Transform Quantization Bypass Mode

For each coding unit, or coding block it can be indicated whether both transform and quantization are bypassed indicating that the residual signal from inter- or intra-picture prediction is directly entropy coded for that block. In that mode the in-loop filter is skipped.

FURTHER EMBODIMENTS

In the following, embodiments of the invention will be described again in more general terms. The following embodiments may optionally be combined with any of the features described above.

In the following further embodiments, the following options may apply to all of the embodiments: the data stream may be a video data stream or an audio data stream. The apparatus for decoding a data stream may be an apparatus for decoding a video from the video data stream or an apparatus for decoding an audio signal from an audio data stream. The apparatus for encoding a data stream may be an apparatus for encoding a video into a video data stream or for encoding an audio signal into an audio data stream. The payload packets may be coded video payload packets carrying video data, e.g., encoded video data. The term supplemental information packet may be used equivalently to the term supplemental information payload packet. The expression "checking a data stream on trustworthiness" and "verifying a data stream" may be used in an interchangeable manner.

The different aspects are combinable, i.e., any feature defined with respect to any of the aspects may be combined with any of the further aspects.

1. Apparatus 20 for decoding a data stream, the data stream comprising a temporal sequence of segments 17, wherein the apparatus is configured for, for a segment of the sequence of segments, determining 30 a predetermined portion 13 of the segment;

deriving 21, from the data stream, an indication 61 which indicates whether the segment is the first segment of a signed subsequence of the temporal sequence, or whether the segment is the last segment of a signed subsequence of the temporal sequence; and deriving 21, from the data stream, a digital signature 43, which is for being checked against a verification string 48 obtained based on the predetermined portion 13 and based on the indication 61.

2. Apparatus according to embodiment 1, wherein the apparatus is configured for verifying the predetermined portion 13 by checking whether the verification string 48 fits to the digital signature 43.

3. Apparatus according to embodiment 1 or 2, wherein the apparatus is configured for providing the predetermined portion 13, the indication 61 and the digital signature 43 for a verification of the predetermined portion 13.

4. Apparatus according to any of the embodiments 1 to 3, wherein the predetermined portion 13 is to be subjected to a hash function to obtain a hash value, and wherein the verification string 48 is obtained based on the hash value.

5. Apparatus according to any of the embodiments 1 to 4, wherein the predetermined portion 13 and the indication are to be subjected to a hash function to obtain a hash value, and wherein the verification string 48 is obtained based on the hash value.

6. Apparatus 20 for decoding a data stream 14, wherein the apparatus is configured for checking the data stream on trustworthiness, the data stream comprising a temporal sequence of segments 17, wherein the apparatus is configured for verifying a segment 17*\* of the sequence of segments by subjecting a predetermined portion 13 of the segment to a hash function 31 to obtain a hash value 33;

deriving 21, from the data stream, an indication 61 which indicates whether the segment is the first segment of a signed subsequence of the temporal sequence, or whether the segment is the last segment of a signed subsequence of the temporal sequence;

forming a verification string 48 based on the hash value 33 and based on the indication 61;

deriving a digital signature 43 from the data stream and checking whether the verification string 48 fits to the digital signature 43.

7. Apparatus according to any of the embodiments 1 to 6, wherein the checking whether the verification string 48 fits to the digital signature 43 comprises:

decrypting the digital signature 43 to obtain a check value; and checking whether the verification string 48 matches the check value.

8. Apparatus according to any of the embodiments 1 to 7, configured for deriving the indication from a supplemental information message associated with the segment.

9. Apparatus according to embodiment 8, wherein the supplemental information message is indicative of the hash function and/or a certificate for decrypting the digital signature 43.

10. Apparatus according to any of the embodiments 1 to 7, configured for deriving the indication from a supplemental information message, which is indicative of the digital signature 43.

11. Apparatus according to any of the embodiments 1 to 10, configured for deriving, from the data stream, the indication, which indicates whether the segment is the first segment of a signed subsequence of the temporal sequence, wherein the apparatus is configured for if the segment is the first segment of the signed subsequence, forming the verification string 48 independent of any portion of the data stream, which portion precedes the segment in the temporal sequence.

12. Apparatus according to embodiment 11, configured for if the segment is not the first segment of the signed subsequence, forming the verification string 48 further based on a previous hash value obtained for the preceding segment of the segment.

13. Apparatus according to any of the embodiments 1 to 12, configured for deriving a number of portions, in units of which the segment 17 is verifiable, wherein the number of portions include the predetermined portion 13, and wherein the portions of the number of portions have a hierarchical order.

14. Apparatus according to embodiment 13, wherein the apparatus is configured for if the predetermined portion 13 is not the first portion within the hierarchical order among the portions, forming the verification string 48 further based on a previous hash value obtained for a preceding portion, which precedes the predetermined portion 13 in the hierarchical order.

15. Apparatus according to embodiment 13 or 14, wherein the predetermined portion 13 is the first portion within the hierarchical order among the portions, and wherein the apparatus is configured for, in verifying a subsequent portion of the number of portions, which follows the predetermined portion 13 in the hierarchical order, forming a subsequent verification string 48 for verifying the subsequent portion based on the hash value obtained by the subjecting of the predetermined portion 13 to the hash function.

16. Apparatus according to any of the embodiments 13 to 15, configured for selectively deriving the indication from the data stream, if the predetermined portion 13 is the first portion within the hierarchical order of the number of portions.

17. Apparatus 10 for encoding a data stream, wherein the apparatus is configured for rendering the data stream checkable on trustworthiness, and encoding, into the data stream, a temporal sequence of segments, wherein the apparatus is configured for rendering a segment of the sequence of segments checkable on trustworthiness by subjecting a predetermined portion 13 of the segment to a hash function to obtain a hash value;

inserting 23, into the data stream, an indication 61 which indicates whether the segment is the first segment of a signed subsequence of the temporal sequence, or whether the segment is the last segment of a signed subsequence of the temporal sequence;

forming a verification string 48 based on the hash value and based on the indication;

obtaining a digital signature 43 based on the verification string 48.

18. Apparatus according to embodiment 17, configured for, in obtaining the digital signature 43, signing the verification string 48.

19. Apparatus according to embodiment 17 or 18, configured for inserting the indication into a supplemental information message associated with the segment.

20. Apparatus according to embodiment 19, wherein the supplemental information message is indicative of the hash function and/or a certificate for decrypting the digital signature 43.

21. Apparatus according to embodiment 17 or 18, configured for inserting the indication and the digital signature 43 into a supplemental information message.

22. Apparatus according to any of the embodiments 17 to 21, configured for inserting, into the data stream, the indication, which indicates whether the segment is the first segment of a signed subsequence of the temporal sequence, wherein the apparatus is configured for if the segment is the first segment of the signed subsequence, forming the verification string 48 independent of any portion of the data stream, which portion precedes the segment in the temporal sequence.

23. Apparatus according to embodiment 22, configured for if the segment is not the first segment of the signed subsequence, forming the verification string 48 further based on a previous hash value obtained for the preceding segment of the segment.

24. Apparatus according to any of the embodiments 17 to 23, configured for deriving a number of portions, and rendering the segment checkable on trustworthiness in units of the portions, wherein the number of portions include the predetermined portion 13, and wherein the portions of the number of portions have a hierarchical order.

25. Apparatus according to embodiment 24, wherein the apparatus is configured for if the predetermined portion 13 is not the first portion within the hierarchical order among the portions, forming the verification string 48 further based on a previous hash value obtained for a preceding portion, which precedes the predetermined portion 13 in the hierarchical order.

26. Apparatus according to embodiment 24 or 25, wherein the predetermined portion 13 is the first portion within the hierarchical order among the portions, and wherein the apparatus is configured for, in verifying a subsequent portion of the number of portions, which follows the predetermined portion 13 in the hierarchical order, forming a subsequent verification string 48 for verifying the subsequent portion based on the hash value obtained by the subjecting of the predetermined portion 13 to the hash function.

27. Apparatus according to any of the embodiments 24 to 26, configured for selectively inserting the indication into the data stream, if the predetermined portion 13 is the first portion within the hierarchical order of the number of portions.

28. Method for decoding a data stream, the data stream comprising a temporal sequence of segments 17, wherein the method comprises, for a segment of the sequence of segments, determining 30 a predetermined portion 13 of the segment;

deriving 21, from the data stream, an indication 61 which indicates whether the segment is the first segment of a signed subsequence of the temporal sequence, or whether the segment is the last segment of a signed subsequence of the temporal sequence; and deriving 21, from the data stream, a digital signature 43, which is for being checked against a verification string 48 obtained based on the predetermined portion 13 and based on the indication 61.

29. Method for decoding a data stream 14, wherein the method comprises checking the data stream on trustworthiness, the data stream comprising a temporal sequence of segments 17, wherein the method comprises verifying a segment 17\* of the sequence of segments by subjecting a predetermined portion 13 of the segment to a hash function 31 to obtain a hash value 33;

deriving 21, from the data stream, an indication 61 which indicates whether the segment is the first segment of a signed subsequence of the temporal sequence, or whether the segment is the last segment of a signed subsequence of the temporal sequence;

forming a verification string 48 based on the hash value 33 and based on the indication 61;

deriving a digital signature 43 from the data stream and checking whether the verification string 48 fits to the digital signature 43.

30. Method for encoding a data stream, wherein the method comprises rendering the data stream checkable on trustworthiness, and encoding, into the data stream, a temporal sequence of segments, wherein the method comprises rendering a segment of the sequence of segments checkable on trustworthiness by subjecting a predetermined portion 13 of the segment to a hash function to obtain a hash value;

inserting, into the data stream, an indication which indicates whether the segment is the first segment of a signed subsequence of the temporal sequence, or whether the segment is the last segment of a signed subsequence of the temporal sequence;

forming a verification string 48 based on the hash value and based on the indication;

obtaining a digital signature 43 based on the verification string 48.

31. Data stream, the data stream being checkable on trustworthiness, the data stream comprising:

a temporal sequence of segments, an indication which indicates whether the segment is the first segment of a signed subsequence of the temporal sequence, or whether the segment is the last segment of a signed subsequence of the temporal sequence.

32. Data stream according to embodiment 31, wherein the data stream is provided using the method of embodiment 30.

33 Apparatus 20 for decoding a data stream 14, the data stream comprising a temporal sequence of segments 17, wherein the apparatus is configured for deriving 21, from the data stream, for a segment 17\* of the sequence of segments, whether a verification chain within the temporal sequence of segments is interrupted at the segment; and if the data stream indicates that the verification chain is interrupted, and if the data stream comprises a digital signature 43 for checking the segment on trustworthiness, deriving 21, from the data stream, the digital signature 43, which is for being checked against a verification string 48, which is independent of a preceding segment, which directly precedes the segment 17\* in the temporal sequence.

34. Apparatus according to embodiment 33, wherein the apparatus is configured for verifying the segment by checking whether the verification string 48 fits to the digital signature 43.

35. Apparatus according to embodiment 33 or 34, wherein the apparatus is configured for providing a predetermined portion 13 of the segments and the digital signature 43 for a verification of the segment.

36. Apparatus 20 for decoding a data stream 14, wherein the apparatus is configured for checking the data stream on trustworthiness, the data stream comprising a temporal sequence of segments, wherein the apparatus is configured for deriving 21, from the data stream, whether a verification chain within the temporal sequence of segments is interrupted at the segment; and if the data stream indicates that the verification chain is interrupted, and if the data stream comprises a digital signature 43 for the segment deriving 21 the digital signature 43 from the data stream;

forming 39 a verification string 48 independent of a preceding segment, which directly precedes the segment in the temporal sequence; and checking 63 whether the verification string 48 fits to the digital signature 43.

37. Apparatus according to any of the embodiments 33 to 36, configured for deriving, from the data stream, an indication which indicates, for the segment, whether the verification chain is interrupted at the segment.

38. Apparatus according to any of the embodiments 33 to 37, configured for checking, whether the segment is checkable on trustworthiness, and if the segment is not checkable on trustworthiness, assuming that the verification chain is interrupted at the segment.

39. Apparatus according to any of embodiments 34 to 36, wherein the checking whether the verification string 48 fits to the digital signature 43 comprises:
    decrypting the digital signature 43 to obtain a check value; and
    checking whether the verification string 48 matches the check value.

40. Apparatus according to any of the embodiments 33 to 39, wherein the forming the verification string 48 comprises subjecting a predetermined portion 13 of the segment to a hash function to obtain a hash value and forming the verification string 48 based on the hash value.

41. Apparatus according to any of the embodiments 33 to 40, wherein the forming the verification string 48 comprises: if the data stream indicates no interruption of the verification chain, and if the data stream comprises a digital signature 43 for the segment, forming the verification string 48 using a previous hash value, the previous hash value being obtained by subjecting a portion of the preceding segment to a hash function.

42. Apparatus according to any of the embodiments 33 to 41, wherein the forming the verification string 48 comprises: if the data stream indicates that the verification chain is interrupted, and if the data stream comprises a digital signature 43 for the segment, forming the verification string 48 independent of any of the segments, which precede the segment in the temporal sequence.

43. Apparatus according to any of the embodiments 33 to 42, wherein the checking the segment on trustworthiness comprises: if the data stream indicates that the verification chain is interrupted, and if the data stream comprises a digital signature 43 for the segment,
    checking, whether the segment is the first segment of a further verification chain; and
    if the segment is the first segment of a further verification chain, forming the verification string 48 independent of any of the segments, which precede the segment in the temporal sequence.

44. Apparatus according to embodiment 43, wherein the checking the segment on trustworthiness comprises: if the segment is not the first segment of a further verification chain,
    forming the verification string 48 using a further previous hash value, the further previous hash value being obtained by subjecting a portion of a further preceding segment of the temporal sequence to a hash function.

45. Apparatus according to any of the embodiments 33 to 44, wherein the checking the segment on trustworthiness comprises: if the data stream indicates that the verification chain is interrupted, and if the data stream comprises a digital signature 43 for the segment,
    checking, whether the segment is the first segment of a further verification chain; and
    if the segment is not the first segment of a further verification chain, forming the verification string 48 using a further previous hash value, the further previous hash value being obtained by subjecting a portion of a further preceding segment of the temporal sequence to a hash function.

46. Apparatus according to embodiment 44 or 45, configured for, in checking, whether the segment is the first segment of a further verification chain,
    deriving, from the data stream, an indication which indicates whether the segment is the first segment of a verification chain.

47. Apparatus according to embodiment 44 or 45, configured for, in checking, whether the segment is the first segment of a further verification chain,
    deriving, from the data stream, verification information for the segment; and comparing the verification information to preceding verification information for a further preceding segment of the temporal sequence;
    if the verification information matches the preceding verification information, inferring that the segment is not the first segment of a further verification chain;
    if the verification information does not match the preceding verification information, inferring that the segment is the first segment of a further verification chain.

48. Apparatus according to embodiment 46, wherein the verification information comprises one or more of
    an indication of a certificate for decrypting the digital signature 43;
    an indication of a hash function;
    an identifier of a content of the segment.

49. Apparatus according to any of the embodiments 33 to 48, wherein the checking the segment on trustworthiness comprises: if the indication indicates that the verification chain is interrupted, and
    if the data stream does not comprise a digital signature 43 for the segment, or
    if the segment is the first segment of a further verification chain,
    storing a previous hash value, the previous hash value being obtained by subjecting a portion of the preceding segment to a hash function for verifying a subsequent segment of the temporal sequence.

50. Apparatus 10 for encoding a data stream 14, wherein the apparatus is configured for rendering the data stream checkable on trustworthiness, and encoding, into the data stream, a temporal sequence of segments, wherein the apparatus is configured for
    if a verification chain within the temporal sequence of segments is interrupted at the segment, and if the segment is to be rendered checkable on trustworthiness,
        forming a verification string 48 independent of a preceding segment, which directly precedes the segment in the temporal sequence; and
        obtaining a digital signature 43 based on the verification string 48; and
        inserting the digital signature 43 into the data stream.

51. Apparatus according to embodiment 50, configured for inserting, into the data stream, an indication, which indicates whether a verification chain within the temporal sequence of segments is interrupted at the segment; and.

52. Apparatus according to embodiment 50, configured for treating the segment as if the verification chain is interrupted at the segment, if the segment is not to be rendered checkable on trustworthiness.

53. Apparatus according to any of embodiments 50 to 52, configured for, in obtaining the digital signature 43, signing the verification string 48.

54. Apparatus according to any of the embodiments 50 to 53, configured for forming the verification string 48 by subjecting a predetermined portion 13 of the segment to a hash function to obtain a hash value and forming the verification string 48 based on the hash value.

55. Apparatus according to any of the embodiments 50 to 54, configured for, if the verification chain is not interrupted at the segment, and if the segment is to be rendered checkable on trustworthiness, forming the verification string 48 using a previous hash value, the previous hash value being obtained by subjecting a portion of the preceding segment to a hash function.

56. Apparatus according to any of the embodiments 50 to 55, configured for, if the verification chain is interrupted at the segment, and if the segment is to be rendered checkable on trustworthiness, forming the verification string 48 independent of any of the segments, which precede the segment in the temporal sequence.

57. Apparatus according to any of the embodiments 50 to 56, configured for, if the verification chain is interrupted at the segment, and if the segment is to be rendered checkable on trustworthiness, if the segment is the first segment of a further verification chain, forming the verification string 48 independent of any of the segments, which precede the segment in the temporal sequence.

58. Apparatus according to embodiment 57, configured for, if the segment is not the first segment of a further verification chain, forming the verification string 48 using a further previous hash value, the further previous hash value being obtained by subjecting a portion of a further preceding segment of the temporal sequence to a hash function.

59. Apparatus according to any of the embodiments 50 to 58, configured for, if the verification chain is interrupted at the segment, and if the segment is to be rendered checkable on trustworthiness, if the segment is not the first segment of a further verification chain, forming the verification string 48 using a further previous hash value, the further previous hash value being obtained by subjecting a portion of a further preceding segment of the temporal sequence to a hash function.

60. Apparatus according to embodiment 58 or 59, configured for, inserting, into the data stream, an indication which indicates whether the segment is the first segment of a verification chain.

61. Apparatus according to any of the embodiments 50 to 60, configured for, if the verification chain is interrupted at the segment, and if the segment is not to be rendered checkable on trustworthiness, or if the segment is the first segment of a further verification chain, storing a previous hash value, the previous hash value being obtained by subjecting a portion of the preceding segment to a hash function for verifying a subsequent segment of the temporal sequence.

62. Method for decoding a data stream 14, the data stream comprising a temporal sequence of segments 17, wherein the method comprises deriving 21, from the data stream, for a segment 17\* of the sequence of segments, whether a verification chain within the temporal sequence of segments is interrupted at the segment; and if the data stream indicates that the verification chain is interrupted, and if the data stream comprises a digital signature 43 for checking the segment on trustworthiness, deriving 21, from the data stream, the digital signature 43, which is for being checked against a verification string 48, which is independent of a preceding segment, which directly precedes the segment 17\* in the temporal sequence.

63. Method for decoding a data stream 14, wherein the method comprises checking the data stream on trustworthiness, the data stream comprising a temporal sequence of segments, wherein the method comprises deriving 21, from the data stream, whether a verification chain within the temporal sequence of segments is interrupted at the segment; and if the data stream indicates that the verification chain is interrupted, and if the data stream comprises a digital signature 43 for the segment deriving 21 the digital signature 43 from the data stream;

forming 39 a verification string 48 independent of a preceding segment, which directly precedes the segment in the temporal sequence; and checking 63 whether the verification string 48 fits to the digital signature 43.

64. Method for encoding a data stream 14, wherein the method comprises rendering the data stream checkable on trustworthiness, and encoding, into the data stream, a temporal sequence of segments, wherein the method comprises if a verification chain within the temporal sequence of segments is interrupted at the segment, and if the segment is to be rendered checkable on trustworthiness, forming a verification string 48 independent of a preceding segment, which directly precedes the segment in the temporal sequence; and obtaining a digital signature 43 based on the verification string 48; and inserting the digital signature 43 into the data stream.

65. Data stream 14, generated using the method of embodiment 64.

66. Apparatus according to any one of embodiments 1 to 16, or any one of embodiments 33 to 49, wherein the data stream has a video encoded thereinto, and wherein the apparatus is configured for decoding the video from the data stream by block based predictive and transform based residual decoding by decoding prediction residual data of a residual block from the data stream by use of context-adaptive variable length decoding by using a first syntax element indicating a total number of non-zero transform coefficients in a transform block representing the residual block, and a trailing-one number, indicating a number of non-zero transform coefficients having an absolute value of one when traversing the coefficients along a scan order, one or more second syntax elements indicating a sign of the non-zero transform coefficients having an absolute value of one when traversing the coefficients along the scan order, one or more third syntax elements indicating a value of the non-zero transform coefficients except for the number of non-zero transform coefficients having an absolute value of one when traversing the coefficients along the scan order, a fourth syntax element indicating a total number of zero-valued transform coefficient levels in the transform block from a firstly-encountered non-zero transform coefficient in the scan order onwards, and one or more fifth syntax elements indicting positions of the non-zero transform coefficients along the scan order by indicating a number of consecutive zero-valued transform coefficients in the scan order between in the scan order consecutively encountered non-zero transform coefficients.

67. Apparatus according to any one of embodiments 1 to 16, or any one of embodiments 33 to 49, wherein the data stream has a video encoded thereinto, and wherein the apparatus is configured for decoding the video from the data stream by block based predictive and transform based residual decoding by decoding prediction residual data of a residual block from the data stream by use of context-adaptive binary arithmetic decoding by decoding a significance map which indicates positions of non-zero transform coefficients in a transform block representing the residual block by, in a forward scan traversing transform coefficients of the transform block, decoding a significance flag which indicates whether a non-zero transform coefficient is positioned at a current position, and, if so, and if the current position is not the last in the forward scan, decoding a last-significance flag which indicates whether the non-zero transform coefficient positioned at the current position is the last non-zero transform coefficient in the forward scan order, and decoding the non-zero transform coefficients' values sequentially in a reverse scan order, reversing the forward scan order.

68. Apparatus according to any one of embodiments 1 to 16, or any one of embodiments 33 to 49, wherein the data stream has a video encoded thereinto, and wherein the apparatus is configured for decoding the video from the data stream by block based predictive decoding and transform based residual decoding by decoding prediction residual data of an intra predicted block from the data stream by use of context-adaptive binary arithmetic decoding by decoding a coordinate of a position in a transform block representing the prediction residual data at which position a last non-zero transform coefficient is encountered when traversing transform coefficients of the transform block along a predetermined scan order, and sequentially decoding values of transform coefficients including and ranked, along the predetermined scan order, between the last non-zero transform coefficient and a firstly scanned transform coefficient, and selecting the predetermined scan order among a diagonal scan order, a horizontal scan order, and a vertical scan order depending on an intra prediction mode of the intra predicted block by use of a mapping which maps each of a plurality of intra prediction modes onto a corresponding one of the diagonal scan order, the horizontal scan order, and the vertical scan order.

69. Apparatus according to any one of embodiments 1 to 16, or any one of embodiments 33 to 49, wherein the data stream has a video encoded thereinto, and wherein the apparatus is configured for decoding the video from the data stream by block-based predictive decoding and transform-based residual decoding by decoding prediction residual data of a residual block from the data stream by use of context-adaptive binary arithmetic decoding of quantization indices of transform coefficients of a transform block representing the residual block and sequential dequantization of the quantization indices according to which a value of a current transform coefficient depends on a parity of quantization indices of previous quantization indices.

70. Apparatus according to any one of embodiments 17 to 27, or any one of embodiments 50 to 61, wherein the apparatus is an encoder configured for encoding a video into the data stream by block-based predictive coding and transform-based residual coding by encoding prediction residual data of a residual block into the data stream by use of context adaptive variable length coding by using a first syntax element indicating a total number of non-zero transform coefficients in a transform block representing the residual block, and a trailing-one number, indicating a number of non-zero transform coefficients having an absolute value of one when traversing the coefficients along a scan order, one or more second syntax elements indicating a sign of the non-zero transform coefficients having an absolute value of one when traversing the coefficients along the scan order, one or more third syntax elements indicating a value of the non-zero transform coefficients except for the number of non-zero transform coefficients having an absolute value of one when traversing the coefficients along the scan order, a fourth syntax element indicating a total number of zero-valued transform coefficient levels in the transform block from a firstly-encountered non-zero transform coefficient in the scan order onwards, and one or more fifth syntax elements indicting positions of the non-zero transform coefficients along the scan order by indicating a number of consecutive zero-valued transform coefficients in the scan order between in the scan order consecutively encountered non-zero transform coefficients.

71. Apparatus according to any one of embodiments 17 to 27, or any one of embodiments 50 to 61, wherein the apparatus is an encoder configured for encoding a video into the data stream by block-based predictive coding and transform-based residual coding by encoding prediction residual data of a residual block into the data stream by use of context-adaptive binary arithmetic coding by encoding a significance map which indicates positions of non-zero transform coefficients in a transform block representing the residual block by, in a forward scan traversing transform coefficients of the transform block, encoding a significance flag which indicates whether a non-zero transform coefficient is positioned at a current position, and, if so, and if the current position is not the last in the forward scan, encoding a last-significance flag which indicates whether the non-zero transform coefficient positioned at the current position is the last non-zero transform coefficient in the forward scan order, and encoding the non-zero transform coefficients' values sequentially in a reverse scan order, reversing the forward scan order.

72. Apparatus according to any one of embodiments 17 to 27, or any one of embodiments 50 to 61, wherein the apparatus is configured for encoding a video into the data stream by block-based predictive coding and transform-based residual coding by encoding prediction residual data of an intra predicted block into the data stream by use of context-adaptive binary arithmetic coding by encoding a coordinate of a position in a transform block representing the prediction residual data at which a last non-zero transform coefficient is encountered when traversing transform coefficients of the transform block along a predetermined scan order, and sequentially encoding values of transform coefficients including and ranked, along the predetermined scan order, between the last non-zero transform coefficient and a firstly scanned transform coefficient, and selecting the predetermined scan order among a diagonal scan order, a horizontal scan order, and a vertical scan order depending on an intra prediction mode of the intra predicted block by use of a mapping which maps each of a plurality of intra prediction modes onto a corresponding one of the diagonal scan order, the horizontal scan order, and the vertical scan order.

73. Apparatus according to any one of embodiments 17 to 27, or any one of embodiments 50 to 61, wherein the apparatus is configured for encoding a video into the data stream by block based predictive encoding and transform based residual encoding by encoding prediction residual data of a residual block into the data stream by use of context-adaptive binary arithmetic coding of quantization indices of transform coefficients of a transform block representing the residual block and sequential quantization of the transform coefficients to obtain the quantization indices, according to which a quantizer for quantizing a current transform coefficient depends on a parity of quantization indices of previous quantization indices.

74. Apparatus according to any one of embodiments 1 to 16, or any one of embodiments 33 to 49, or any one of embodiments 17 to 27, or any one of embodiments 50 to 61, wherein the data stream has a video encoded thereinto by block-based predictive coding and transform-based residual coding by encoding prediction residual data of the residual block into the data stream by use of context adaptive variable length coding by using a first syntax element indicating a total number of non-zero transform coefficients in a transform block representing the residual block, and a trailing-one number, indicating a number of non-zero transform coefficients having an absolute value of one when traversing the coefficients along a scan order, one or more second syntax elements indicating a sign of the non-zero transform coefficients having an absolute value of one when traversing the coefficients along the scan order, one or more third syntax elements indicating a value of the non-zero transform coefficients except for the number of non-zero transform coefficients having an absolute value of one when traversing the coefficients along the scan order, a fourth syntax element indicating a total number of zero-valued transform coefficient levels in the transform block from a firstly-encountered non-zero transform coefficient in the scan order onwards, and one or more fifth syntax elements indicting positions of the non-zero transform coefficients along the scan order by indicating a number of consecutive zero-valued transform coefficients in the scan order between in the scan order consecutively encountered non-zero transform coefficients.

75. Apparatus according to any one of embodiments 1 to 16, or any one of embodiments 33 to 49, or any one of embodiments 17 to 27, or any one of embodiments 50 to 61, wherein the data stream has a video encoded thereinto by block-based predictive coding and transform-based residual coding by encoding prediction residual data of a residual block into the data stream by by use of context-adaptive binary arithmetic coding by encoding a significance map which indicates positions of non-zero transform coefficients in a transform block representing the residual block by, in a forward scan traversing transform coefficients of the transform block, encoding a significance flag which indicates whether a non-zero transform coefficient is positioned at a current position, and, if so, and if the current position is not the last in the forward scan, encoding a last-significance flag which indicates whether the non-zero transform coefficient positioned at the current position is the last non-zero transform coefficient in the forward scan order, and encoding the non-zero transform coefficients' values sequentially in a reverse scan order, reversing the forward scan order.

76. Apparatus according to any one of embodiments 1 to 16, or any one of embodiments 33 to 49, or any one of embodiments 17 to 27, or any one of embodiments 50 to 61, wherein the data stream has a video encoded thereinto by block-based predictive coding and transform-based residual coding by encoding prediction residual data of an intra predicted block into the data stream by use of context-adaptive binary arithmetic coding by encoding a coordinate of a position in a transform block representing the prediction residual data at which a last non-zero transform coefficient is encountered when traversing transform coefficients of the transform block along a predetermined scan order, and sequentially encoding values of transform coefficients including and ranked, along the predetermined scan order, between the last non-zero transform coefficient and a firstly scanned transform coefficient, and selecting the predetermined scan order among a diagonal scan order, a horizontal scan order, and a vertical scan order depending on an intra prediction mode of the intra predicted block by use of a mapping which maps each of a plurality of intra prediction modes onto a corresponding one of the diagonal scan order, the horizontal scan order, and the vertical scan order.

77. Apparatus according to any one of embodiments 1 to 16, or any one of embodiments 33 to 49, or any one of embodiments 17 to 27, or any one of embodiments 50 to 61, wherein the data stream has a video encoded thereinto by block based predictive encoding and transform based residual encoding by encoding prediction residual data of a residual block into the data stream by use of context-adaptive binary arithmetic coding of quantization indices of transform coefficients of a transform block representing the residual block and sequential quantization of the transform coefficients to obtain the quantization indices, according to which a quantizer for quantizing a current transform coefficient depends on a parity of quantization indices of previous quantization indices.

78. Data stream, generated using the method of embodiment 30 or embodiment 64.

79. Computer program for implementing the method of embodiment 28 or 29 or any one of embodiments 62 to 64 when being executed on a computer or signal processor.

IMPLEMENTATION ALTERNATIVES

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus. In particular, block diagrams illustrating the functionality of an apparatus may also be understood as illustration of a respective method comprising the functions described by the blocks of the block diagram as steps of the method.

The data signal or data stream (e.g., media data stream, video data stream, audio data stream) provided by embodiments of the invention can be stored on a digital storage medium, e.g., a non-transitory or transitory digital storage medium, or can be transmitted on a transmission medium such as a wireless transmission medium or a wired transmission medium. In other words, further embodiments provide a computer product, e.g., a data stream product or bitstream product, e.g., a non-transitory digital storage medium, the computer product including, e.g., having stored thereon, the data signal or data stream according to any of the herein described embodiments.

Further embodiments provide a method for storing data, the method comprising a step of storing a data stream on a digital storage medium, e.g., a non-transitory digital storage medium, the data stream carrying the data. For example, the data stream is in accordance with any of the embodiments described herein. For example, has the data encoded thereinto according to any of the encoding methods described herein.

Further embodiments provide a method for transmitting a data stream of any of the embodiments described herein.

Features described with respect to an apparatus for receiving or processing a signal (e.g., receiver, decoder) are to be understood to serve as a description of a respective feature for an apparatus for providing the signal (e.g., an encoder) and vice versa, and as a feature of a respective signal, e.g., a data stream. In particular, the skilled person will understand that any information, e.g., a data type, structure, item, which is to be received by the receiver, or derived from the signal by the receiver, is inserted into the signal by a corresponding provider, and vice versa.

Some or all of the method steps may be executed by (or using) a hardware apparatus, like for example, a microprocessor, a programmable computer or an electronic circuit. In some embodiments, one or more of the method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples involve more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for decoding an audio data stream having an audio signal encoded thereinto, the audio data stream comprising a temporal sequence of segments, wherein the apparatus comprises a processor coupled to the memory is configured, for a segment of the sequence of segments, determining a predetermined portion of the segment;

deriving, from the audio data stream, an indication which indicates whether the segment is the first segment of a signed subsequence of the temporal sequence, or whether the segment is the last segment of a signed subsequence of the temporal sequence;

and deriving, from the audio data stream, a digital signature, which is for being checked against a verification string acquired based on the predetermined portion and based on the indication, deriving, from the audio data stream, the indication, which indicates whether the segment is the first segment of the signed subsequence of the temporal sequence, wherein the apparatus is configured for if the segment is the first segment of the signed subsequence, forming the verification string independent of any portion of the audio data stream, which portion precedes the segment in the temporal sequence;

and if the segment is not the first segment of the signed subsequence, deriving the verification string further based on a previous hash value acquired for the preceding segment of the segment.

2. Apparatus according to claim 1, wherein the apparatus is configured for verifying the predetermined portion by checking whether the verification string fits to the digital signature.

3. Apparatus according to claim 1, wherein the apparatus is configured for providing the predetermined portion, the indication and the digital signature for a verification of the predetermined portion.

4. Apparatus according to claim 1, wherein the predetermined portion is to be subjected to a hash function to acquire a hash value, and wherein the verification string is acquired based on the hash value.

5. Apparatus according to claim 1, wherein the predetermined portion and the indication are to be subjected to a hash function to acquire a hash value, and wherein the verification string is acquired based on the hash value.

6. Apparatus according claim 1, wherein the checking whether the verification string fits to the digital signature comprises:

decrypting the digital signature to acquire a check value; and checking whether the verification string matches the check value.

7. Apparatus according to claim 1, configured for deriving the indication from a supplemental information message associated with the segment.

8. Apparatus according to claim 7, wherein the supplemental information message is indicative of the hash function and/or a certificate for decrypting the digital signature.

9. Apparatus according to claim 1, configured for deriving the indication from a supplemental information message, which is indicative of the digital signature.

10. An apparatus for encoding an audio data stream having an audio signal encoded thereinto, wherein the apparatus comprises a processor coupled to the memory is configured for rendering the audio data stream checkable on trustworthiness, and encoding, into the audio data stream, a temporal sequence of segments, wherein the apparatus is configured for rendering a segment of the sequence of segments checkable on trustworthiness by subjecting a predetermined portion of the segment to a hash function to acquire a hash value;

inserting, into the audio data stream, an indication which indicates whether the segment is the first segment of a signed subsequence of the temporal sequence, or whether the segment is the last segment of a signed subsequence of the temporal sequence;

forming a verification string based on the hash value and based on the indication;

acquiring a digital signature based on the verification string, inserting, into the audio data stream, the indication, which indicates whether the segment is the first segment of the signed subsequence of the temporal sequence, wherein the apparatus is configured for if the segment is the first segment of the signed subsequence, forming the verification string independent of any portion of the audio data stream, which portion precedes the segment in the temporal sequence;

and if the segment is not the first segment of the signed subsequence, deriving the verification string further based on a previous hash value acquired for the preceding segment of the segment.

11. Apparatus according to claim 10, configured for, in acquiring the digital signature, signing the verification string.

12. Apparatus according to claim 10, configured for inserting the indication into a supplemental information message associated with the segment.

13. Apparatus according to claim 12, wherein the supplemental information message is indicative of the hash function and/or a certificate for decrypting the digital signature.

14. Apparatus according to claim 10, configured for inserting the indication and the digital signature into a supplemental information message.

15. A method for decoding an audio data stream having an audio signal encoded thereinto, the audio data stream comprising a temporal sequence of segments, wherein the method comprises, for a segment of the sequence of segments, determining a predetermined portion of the segment;

deriving, from the audio data stream, an indication which indicates whether the segment is the first segment of a signed subsequence of the temporal sequence, or whether the segment is the last segment of a signed subsequence of the temporal sequence; and deriving, from the audio data stream, a digital signature, which is for being checked against a verification string acquired based on the predetermined portion and based on the indication, deriving, from the audio data stream, the indication, which indicates whether the segment is the first segment of the signed subsequence of the temporal sequence, wherein the apparatus is configured for if the segment is the first segment of the signed subsequence, forming the verification string independent of any portion of the audio data stream, which portion precedes the segment in the temporal sequence;

and if the segment is not the first segment of the signed subsequence, deriving the verification string further based on a previous hash value acquired for the preceding segment of the segment.

16. An audio data stream having an audio signal encoded thereinto, the audio data stream being checkable on trustworthiness, the audio data stream comprising:

a temporal sequence of segments, an indication which indicates whether the segment is the first segment of a signed subsequence of the temporal sequence, or whether the segment is the last segment of a signed subsequence of the temporal sequence, forming a verification string based on the hash value and based on the indication;

acquiring a digital signature based on the verification string, inserting, into the audio data stream, the indication, which indicates whether the segment is the first segment of the signed subsequence of the temporal sequence, if the segment is the first segment of the signed subsequence, forming the verification string independent of any portion of the audio data stream, which portion precedes the segment in the temporal sequence;

and if the segment is not the first segment of the signed subsequence, deriving the verification string further based on a previous hash value acquired for the preceding segment of the segment.

* * * * *